US012609769B2

(12) United States Patent
Abe

(10) Patent No.: US 12,609,769 B2
(45) Date of Patent: Apr. 21, 2026

(54) MONITORING OPTICAL SIGNAL ARRIVAL ADJUSTMENT DEVICE, OPTICAL COMMUNICATION TRANSMISSION PATH, OPTICAL COMMUNICATION SYSTEM, AND OPTICAL COMMUNICATION TRANSMISSION PATH MONITORING METHOD

(71) Applicant: NEC Corporation, Tokyo (JP)

(72) Inventor: Ryota Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 516 days.

(21) Appl. No.: 18/025,873

(22) PCT Filed: Jul. 21, 2021

(86) PCT No.: PCT/JP2021/027330
§ 371 (c)(1),
(2) Date: Mar. 10, 2023

(87) PCT Pub. No.: WO2022/059345
PCT Pub. Date: Mar. 24, 2022

(65) Prior Publication Data
US 2023/0361877 A1 Nov. 9, 2023

(30) Foreign Application Priority Data
Sep. 17, 2020 (JP) ................................. 2020-156151

(51) Int. Cl.
*H04B 10/291* (2013.01)
*H04B 10/077* (2013.01)

(52) U.S. Cl.
CPC ......... *H04B 10/291* (2013.01); *H04B 10/077* (2013.01)

(58) Field of Classification Search
CPC .......................... H04B 10/291; H04B 410/077
(Continued)

(56) References Cited

U.S. PATENT DOCUMENTS 8,750,707 B2 * 6/2014 Sabet .................... H04L 9/3236
380/263
8,891,957 B2 * 11/2014 Mu .................. H04B 10/07955
398/1
(Continued)

FOREIGN PATENT DOCUMENTS

EP 2720387 A1 * 4/2014 ........... H04B 10/298
JP H10-262030 A 9/1998
(Continued)

OTHER PUBLICATIONS

International Search Report for PCT Application No. PCT/JP2021/027330, mailed on Sep. 14, 2021.
(Continued)

*Primary Examiner* — Amritbir K Sandhu
(74) *Attorney, Agent, or Firm* — Sughrue Mion, PLLC

(57) ABSTRACT

A monitoring optical signal arrival adjustment device includes a first monitoring optical signal arrival adjustment unit which allows a first monitoring optical signal transmitted to a first position on a first optical transmission path to reach the first position or a second position on a second optical transmission path, and does not allow it to reach a third position on a third optical transmission path; a second monitoring optical signal arrival adjustment unit which allows a second monitoring optical signal transmitted to the second position to reach the first position or the second position, and does not allow it to reach the third position; and a third monitoring optical signal arrival adjustment unit which allows a third monitoring optical signal transmitted to the third position to reach the third position, and does not allow it to reach the first position or the second position.

14 Claims, 15 Drawing Sheets

(58) Field of Classification Search
 USPC .......................................................... 398/97
 See application file for complete search history.

(56) References Cited

U.S. PATENT DOCUMENTS

| | | | | |
|---|---|---|---|---|
| 9,276,694 | B2 * | 3/2016 | Wang .................. | H04J 14/0227 |
| 10,003,425 | B2 * | 6/2018 | Abbott ................ | H04J 14/0205 |
| 11,888,583 | B2 * | 1/2024 | Yaman ............... | H04Q 11/0001 |
| 2007/0053631 | A1 * | 3/2007 | Yeh .................... | G02B 6/29317 |
| | | | | 385/24 |
| 2011/0311216 | A1 * | 12/2011 | Inoue .................... | H04B 10/27 |
| | | | | 398/1 |
| 2012/0177362 | A1 * | 7/2012 | Zhang ................. | H04J 14/0202 |
| | | | | 398/9 |
| 2015/0093116 | A1 * | 4/2015 | Wang .................. | H04J 14/0213 |
| | | | | 398/104 |
| 2021/0152273 | A1 * | 5/2021 | Park .................... | H04J 14/0272 |
| 2023/0361877 | A1 * | 11/2023 | Abe .................... | H04B 10/071 |

FOREIGN PATENT DOCUMENTS

| | | | | | |
|---|---|---|---|---|---|
| JP | H10256995 | A | * | 9/1998 | |
| JP | H102569995 | A | * | 9/1998 | |
| JP | 2002-280968 | A | | 9/2002 | |
| JP | 2005-136602 | A | | 5/2005 | |
| WO | WO-2014035303 | A1 | * | 3/2014 | ........... H04B 10/291 |
| WO | WO-2019087520 | A1 | * | 5/2019 | ............ H04B 10/03 |
| WO | WO-2019244660 | A1 | * | 12/2019 | ............ G01M 11/00 |

OTHER PUBLICATIONS

English translation of Written opinion for PCT Application No. PCT/JP2021/027330, mailed on Sep. 14, 2021.

* cited by examiner

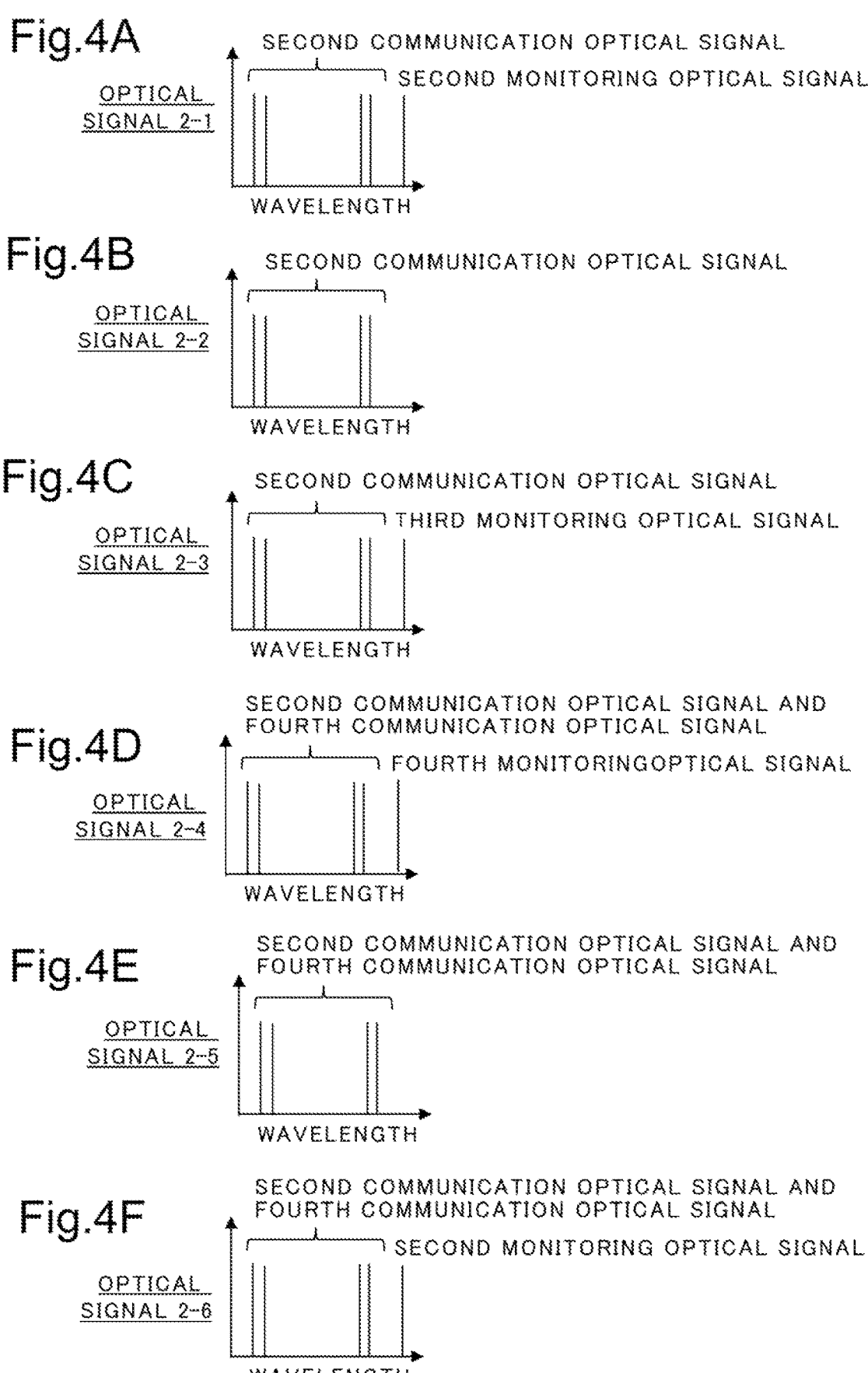

Fig.12

OPTICAL COMMUNICATION SYSTEM 101

T2

T1

BK13

BK12

BK11

T33

T32

T31

111

121

122

123

TROUBLE OCCURS

MONITORING OPTICAL SIGNAL ARRIVAL ADJUSTMENT DEVICE, OPTICAL COMMUNICATION TRANSMISSION PATH, OPTICAL COMMUNICATION SYSTEM, AND OPTICAL COMMUNICATION TRANSMISSION PATH MONITORING METHOD

This application is a National Stage Entry of PCT/JP2021/027330 filed on Jul. 21, 2021, which claims priority from Japanese Patent Application 2020-156151 filed on Sep. 17, 2020, the contents of all of which are incorporated herein by reference, in their entirety.

TECHNICAL FIELD

The present invention relates to monitoring of an optical communication transmission path including a branch device.

BACKGROUND ART

In an optical communication system including an optical cable as an optical communication transmission path, intensity of an optical signal amplified by a relay is generally monitored by using intensity of a monitoring optical signal reflected by a wavelength selection reflector. Herein, the monitoring optical signal is an optical signal to be used for monitoring a communication optical transmission path. For example, PTL 1 discloses an optical amplification relay system including a monitoring optical signal loopback circuit that takes out, via an optical coupler, a monitoring optical signal being input to one optical transmission line between optical transmission lines, loops back the monitoring optical signal by a wavelength selection reflection means, and transfers the monitoring optical signal to another optical transmission line.

FIG. 1 is a schematic diagram illustrating a configuration of an optical communication system 101 being an example of a general optical communication system that monitors, by a wavelength selection reflector, intensity of an optical signal being amplified by a relay. The optical communication system 101 includes terminal stations T1 to T3, relays CK1 to CK3, a branch device BK1, and optical fiber core wires F1U, F1D, F2U, F2D, F3U, F3D, F4U, and F4D.

An optical communication transmission path between the terminal station T1 and the terminal station T2 is a trunk 111. The trunk is generally an optical communication transmission path in which optical communication having a large communication capacity is performed. The optical communication transmission path included in the trunk 111 between the terminal station T1 and the branch device BK1 includes an optical fiber core wire pair formed of the optical fiber core wires F1U and F1D. Communication optical signals in directions opposite to each other travel through each of the optical fiber core wires F1U and F1D. Herein, the communication optical signal is an optical signal to be used for optical communication. The optical fiber core wires F1U and F1D are included in an optical cable.

Further, the optical communication transmission path between the branch device BK1 and the terminal station T2 includes an optical fiber core wire pair formed of the optical fiber core wires F2U and F2D. Communication optical signals in directions opposite to each other travel through each of the optical fiber core wires F2U and F2D. The optical fiber core wires F2U and F2D are included in an optical cable.

The optical fiber core wires F1U and F2U are optical fiber core wires in which an optical signal travels from the terminal station T1 to the terminal station T2. Further, the optical fiber core wires F1D and F2D are optical fiber core wires in which an optical signal travels from the terminal station T2 to the terminal station T1. The relay CK1 amplifies, by optical amplifiers A1 and A2, an optical signal traveling through the optical fiber core wires F1U and F1D. The relay CK2 amplifies, by optical amplifiers A3 and A4, an optical signal traveling through the optical fiber core wires F2U and F2D.

In the trunk 111, a branch 121 that can achieve communication between the terminal station T3 and the terminal stations T1 and T2 is formed by the branch device BK1. The relay CK3 included in the branch 121 amplifies, by optical amplifiers A5 to A8, an optical signal traveling through the optical fiber core wires F3U, F3D, F4U, and F4D included in an optical cable included in the branch 121. Herein, a pair of the optical fiber core wires F3U and F3D is an optical fiber core wire pair in which an optical signal travels from the terminal station T1 to the terminal station T3 and an optical signal travels from the terminal station T2 to the terminal station T3. Further, a pair of the optical fiber core wires F4U and F4D is an optical fiber core wire pair in which an optical signal travels from the terminal station T3 to the terminal station T2 and an optical signal travels from the terminal station T3 to the terminal station T1.

The relay CK1 includes a wavelength selection reflector B11, the relay CK2 includes a wavelength selection reflector B12, and the relay CK3 includes wavelength selection reflectors B13 and B14. Each of the wavelength selection reflectors B11 to B14 is a wavelength selection reflector that reflects light in a wavelength range of a monitoring optical signal and terminates light in another wavelength range.

In the optical communication system 101, an optical signal acquired by superimposing, on a communication optical signal 91, a first monitoring optical signal having a wavelength longer than a band of the communication optical signal 91 is sent from the terminal station T1 to the optical fiber core wire NAL The optical signal is amplified by the optical amplifier A1, passes through an optical switch S1, and travels through the optical fiber core wire F3U. On the optical signal, an optical signal from an optical fiber core wire BP13 is superimposed by an optical coupler P5. The optical signal to be superimposed is a fourth monitoring optical signal, which will be described below, separated by an optical coupler P6, reflected by the wavelength selection reflector B13, incident on the optical fiber core wire BP13 in the optical coupler P6, and superimposed on a communication optical signal 92. The communication optical signal 91 on which the optical signal from the optical fiber core wire BP13 is superimposed is amplified by the optical amplifier A5 and reaches the terminal station T3.

Meanwhile, an optical signal acquired by superimposing, on the communication optical signal 92, a second monitoring optical signal having a wavelength longer than a band of the communication optical signal 92 is sent from the terminal station T2 to the optical fiber core wire F2D. The optical signal is amplified by the optical amplifier A4, passes through an optical switch S4, and travels through the optical fiber core wire F3D. On the optical signal, an optical signal from an optical fiber core wire BP14 is superimposed by an optical coupler P7. The optical signal to be superimposed is a third monitoring optical signal, which will be described below, separated by an optical coupler P8, reflected by the wavelength selection reflector B14, incident on the optical fiber core wire BP14 in the optical coupler P8, and superimposed on the communication optical signal 91. The communication optical signal 92 on which the optical signal from the optical fiber core wire BP14 is superimposed is amplified by the optical amplifier A7 and reaches the terminal station T3.

The terminal station T3 performs reception processing of the communication optical signal 91 that has reached from the optical fiber core wire F3U. Further, the terminal station T3 converts the communication optical signal 91 into an electric-optic signal, and further sends an optical signal (herein assumed to be the communication optical signal 91) converted into an optical signal to the optical fiber core wire F4U. At that time, the terminal station T3 superimposes, on the communication optical signal 91 to be sent to the optical fiber core wire F4U, a third communication optical signal to be sent from the terminal station T3 to the terminal station T2. Furthermore, the terminal station T3 superimposes the third monitoring optical signal on the communication optical signal 91 to be sent to the optical fiber core wire F4U. The third monitoring optical signal is an optical signal having a wavelength longer than a wavelength range of the communication optical signal 91.

The terminal station T3 performs reception processing of the communication optical signal 92 that travels through the optical fiber core wire F3D. Further, the terminal station T3 converts the communication optical signal 92 into an electric-optic signal, and further sends an optical signal (herein assumed to be the communication optical signal 92) converted into an optical signal to the optical fiber core wire F4D. At that time, the terminal station T3 superimposes, on the communication optical signal 92 to be sent to the optical fiber core wire F4D, a fourth communication optical signal to be sent from the terminal station T3 to the terminal station T1. Furthermore, the terminal station T3 superimposes the fourth monitoring optical signal on the communication optical signal 92 to be sent to the optical fiber core wire F4D. The fourth monitoring optical signal is an optical signal having a wavelength longer than a wavelength range of the communication optical signal 92. A wavelength of the fourth monitoring optical signal is generally equal to a wavelength of the third monitoring optical signal.

Further, the terminal station T3 monitors intensity of the fourth monitoring optical signal included in the optical signal reaching from the optical fiber core wire F3U. When the fourth monitoring optical signal is superimposed on the communication optical signal 92 and sent from the terminal station T3 to the optical fiber core wire F4D, a part being separated by the optical coupler P6 is reflected by the wavelength selection reflector B13. The reflected fourth monitoring optical signal is incident on the optical fiber core wire F3U by the optical coupler P6, the optical fiber core wire BP13, and the optical coupler P5, and returns to the terminal station T3. Therefore, the terminal station T3 can monitor an optical path passing through the optical amplifier A6, the optical coupler P6, the optical coupler P5, and the optical amplifier A5 from the terminal station T3 and returning to the terminal station T3 by monitoring intensity of the third monitoring optical signal.

Further, the terminal station T3 monitors intensity of the third monitoring optical signal included in the optical signal reaching from the optical fiber core wire F3D. When the third monitoring optical signal is superimposed on the communication optical signal 91 and sent from the terminal station T3 to the optical fiber core wire F4U, a part being separated by the optical coupler P8 is reflected by the wavelength selection reflector B14. The reflected third monitoring optical signal is incident on the optical fiber core wire F3D by the optical coupler P8, the optical fiber core wire BP14, and the optical coupler P7, and returns to the terminal station T3. Therefore, the terminal station T3 can monitor an optical path passing through the optical amplifier A8, the optical coupler P8, the optical coupler P7, and the optical amplifier A7 from the terminal station T3 and returning to the terminal station T3 by monitoring intensity of the third monitoring optical signal.

The communication optical signal 91 incident on the optical fiber core wire F4U from the terminal station T3 is amplified by the optical amplifier A8, then travels through the optical fiber core wire F2U via an optical switch S2, and is subjected to superimposition of an optical signal from an optical fiber core wire BP12 by an optical coupler P13. The optical signal to be superimposed is the second monitoring optical signal described above separated by an optical coupler P14, reflected by the wavelength selection reflector B2, incident on the optical fiber core wire BP12 in the optical coupler P14, and included in the communication optical signal 92. The communication optical signal 91 on which the optical signal from the optical fiber core wire BP12 is superimposed is amplified by the optical amplifier A3 and then reaches the terminal station T2. The terminal station T2 performs reception processing for the communication optical signal 91.

Further, the terminal station T2 monitors intensity of the second monitoring optical signal included in the optical signal reaching from the optical fiber core wire F2U. When the second monitoring optical signal is superimposed on the communication optical signal 92 and sent from the terminal station T2 to the optical fiber core wire F2D, a part being separated by the optical coupler P14 is reflected by the wavelength selection reflector B12. The reflected second monitoring optical signal is incident on the optical fiber core wire F2U by the optical coupler P14, the optical fiber core wire BP12, and the optical coupler P13, and returns to the terminal station T2. Therefore, the terminal station T2 can monitor an optical path passing through the optical amplifier A4, the optical coupler P14, the optical coupler P13, and the optical amplifier A3 from the terminal station T2 and returning to the terminal station T2 by monitoring intensity of the second monitoring optical signal.

Meanwhile, the communication optical signal 92 incident on the optical fiber core wire F4D from the terminal station T3 is amplified by the optical amplifier A6, then travels through the optical fiber core wire F1D via an optical switch S3, and is subjected to superimposition of an optical signal from an optical fiber core wire BP11 by an optical coupler P11. The optical signal to be superimposed is the first monitoring optical signal described above separated by an optical coupler P12, reflected by the wavelength selection reflector B11, incident on the optical fiber core wire BP11 in the optical coupler P11, and included in the communication optical signal 91. The communication optical signal 92 on which the optical signal from the optical fiber core wire BP11 is superimposed is amplified by the optical amplifier A2 and then reaches the terminal station T1. The terminal station T1 performs reception processing for the communication optical signal 92.

Further, the terminal station T1 monitors intensity of the first monitoring optical signal included in the optical signal reaching from the optical fiber core wire F1D. When the first monitoring optical signal is superimposed on the communication optical signal 91 and sent from the terminal station T1 to the optical fiber core wire F1U, a part being separated by the optical coupler P12 is reflected by the wavelength selection reflector B11. The reflected first monitoring optical signal is incident on the optical fiber core wire F1D by the optical coupler P12, the optical fiber core wire BP11, and the optical coupler P11, and returns to the terminal station T1. Therefore, the terminal station T1 can monitor an optical path passing through the optical amplifier A1, the optical coupler P12, the optical coupler P11, and the optical amplifier A2 from the terminal station T1 and returning to the terminal station T1 by monitoring intensity of the first monitoring optical signal.

Note that Japanese Patent Application No. 2019-061901 discloses a submarine optical branch device that switches among an optical transmission path connected to a first terminal station, a second optical transmission path connected to a second terminal station, and a third optical transmission path connected to a third terminal station.

CITATION LIST

Patent Literature

PTL 1: Japanese Unexamined Patent Application Publication No. 2002-280968

SUMMARY OF INVENTION

Technical Problem

In the optical communication system 101 in FIG. 1, a wavelength of the third and fourth monitoring optical signals needs to be set to a value different from a wavelength of the first and second monitoring optical signals. The reason is that the first and second monitoring optical signals together with the third and fourth monitoring signals are superimposed on a communication optical signal received by the terminal station T3 through the optical fiber core wires F3U and F3D. In that case, when the first and second monitoring optical signals and the third and fourth monitoring signals are equal in wavelength, the terminal station T3 cannot monitor intensity of only the third and fourth monitoring signals.

When a wavelength of the third and fourth monitoring signals is different from that of the first and second monitoring optical signals, a configuration related to a wavelength selection reflector used in a trunk and a branch and reception of a monitoring optical signal has a different specification, and commonality of parts cannot be achieved. This leads to an increase in cost.

In order to solve the problem, a method for changing timings of monitoring between a trunk and a branch is conceivable. In that case, a monitoring signal having the same frequency can be used in the trunk and the branch. However, the method has a problem that a monitoring result at the same time cannot be acquired from the trunk and the branch.

An object of the present invention is to provide a monitoring optical signal arrival adjustment device and the like that enable simultaneous monitoring and also facilitate commonality of parts in an optical communication system.

Solution to Problem

A monitoring optical signal arrival adjustment device according to the present invention includes: a first monitoring optical signal arrival adjustment unit that enables arrival, at a first position being a predetermined position of a first optical transmission path or a second position being a predetermined position of a second optical transmission path, of a first monitoring optical signal being sent to the first position and being a monitoring optical signal for monitoring an optical path, and also disables arrival at a third position being a predetermined position of a third optical transmission path; a second monitoring optical signal arrival adjustment unit that enables arrival of a second monitoring optical signal being sent to the second position and being the monitoring optical signal at the first position or the second position, and also disables arrival at the third position; and a third monitoring optical signal arrival adjustment unit that enables arrival of a third monitoring optical signal being sent to the third position and being the monitoring optical signal at the third position, and also disables arrival at both of the first position and the second position.

Advantageous Effects of Invention

A monitoring optical signal arrival adjustment device and the like according to the present invention enable simultaneous monitoring and also facilitate commonality of parts in an optical communication system.

BRIEF DESCRIPTION OF DRAWINGS

FIG. 4A is an image diagram (part 2) illustrating wavelength dependence of presence or absence of an optical signal of the optical signal 2-1.

FIG. 4B is an image diagram (part 2) illustrating wavelength dependence of presence or absence of an optical signal of the optical signal 2-2.

FIG. 4C is an image diagram (part 2) illustrating wavelength dependence of presence or absence of an optical signal of the optical signal 2-3.

FIG. 4D is an image diagram (part 2) illustrating wavelength dependence of presence or absence of an optical signal of the optical signal 2-4.

FIG. 4E is an image diagram (part 2) illustrating wavelength dependence of presence or absence of an optical signal of the optical signal 2-5.

FIG. 4F is an image diagram (part 2) illustrating wavelength dependence of presence or absence of an optical signal of the optical signal 2-6.

FIG. 12 is an explanatory diagram (part 2) of a further effect.

EXAMPLE EMBODIMENT

In an optical communication system according to the present example embodiment, an optical signal for monitoring (monitoring optical signal) of an optical communication path being sent from a terminal station on a trunk side is configured not to reach a terminal station on a branch side by a combination described below of a wavelength selection reflector and a predetermined optical path. Further, a monitoring optical signal being sent from the terminal station on the branch side is configured not to reach the terminal station on the trunk side. The optical communication system according to the present example embodiment can achieve commonality of a wavelength at a time of simultaneous monitoring of monitoring optical signals being sent from the terminal stations of the trunk and the branch as described above.

Configuration and Operation

Figure 2:
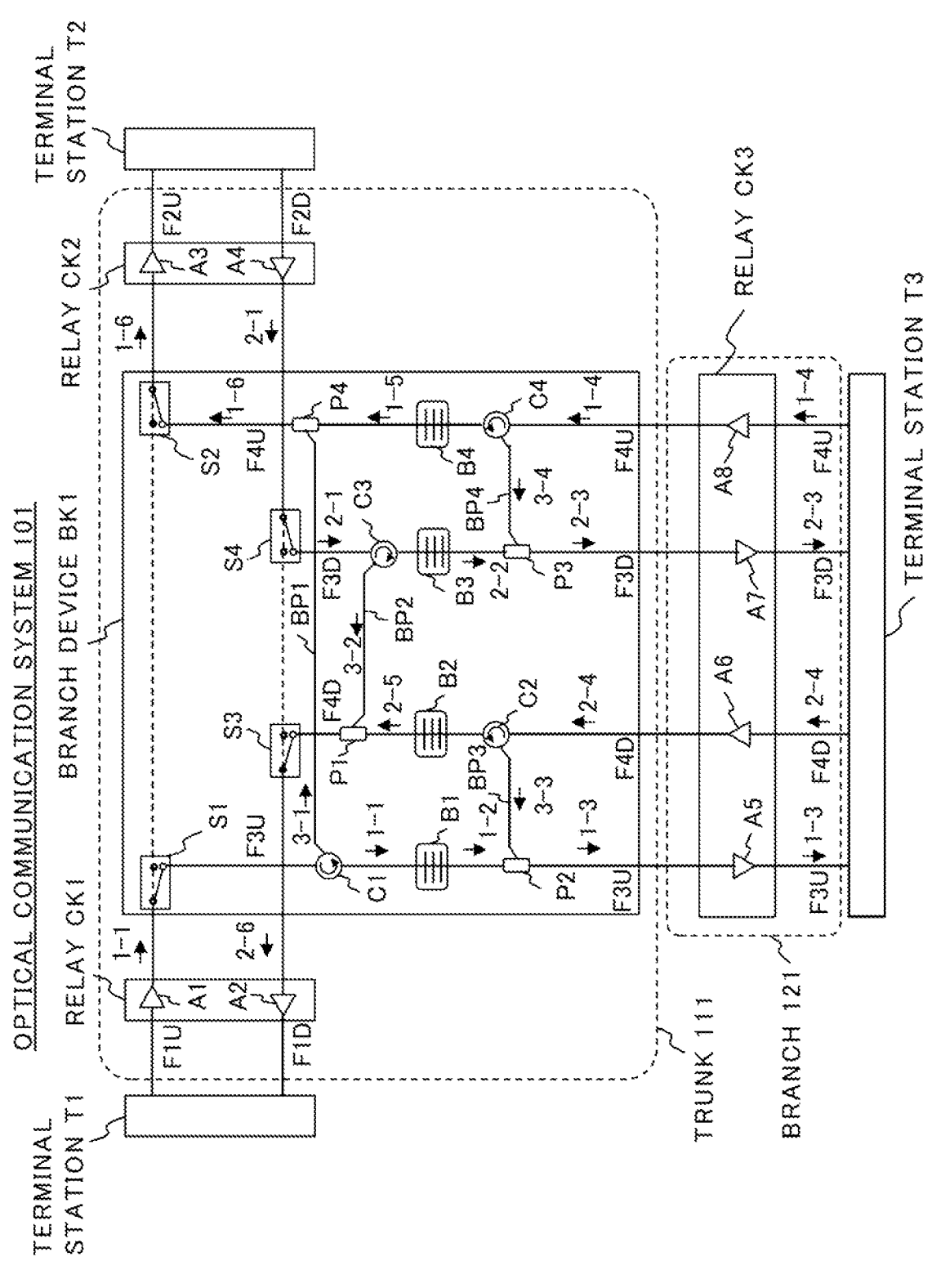
FIG. 2 is a schematic diagram illustrating a configuration example (part 1) of an optical communication system according to the present example embodiment.

FIG. 2 is a schematic diagram illustrating a configuration of an optical communication system 101 being an example of an optical communication system according to the present example embodiment.

Figure 1:
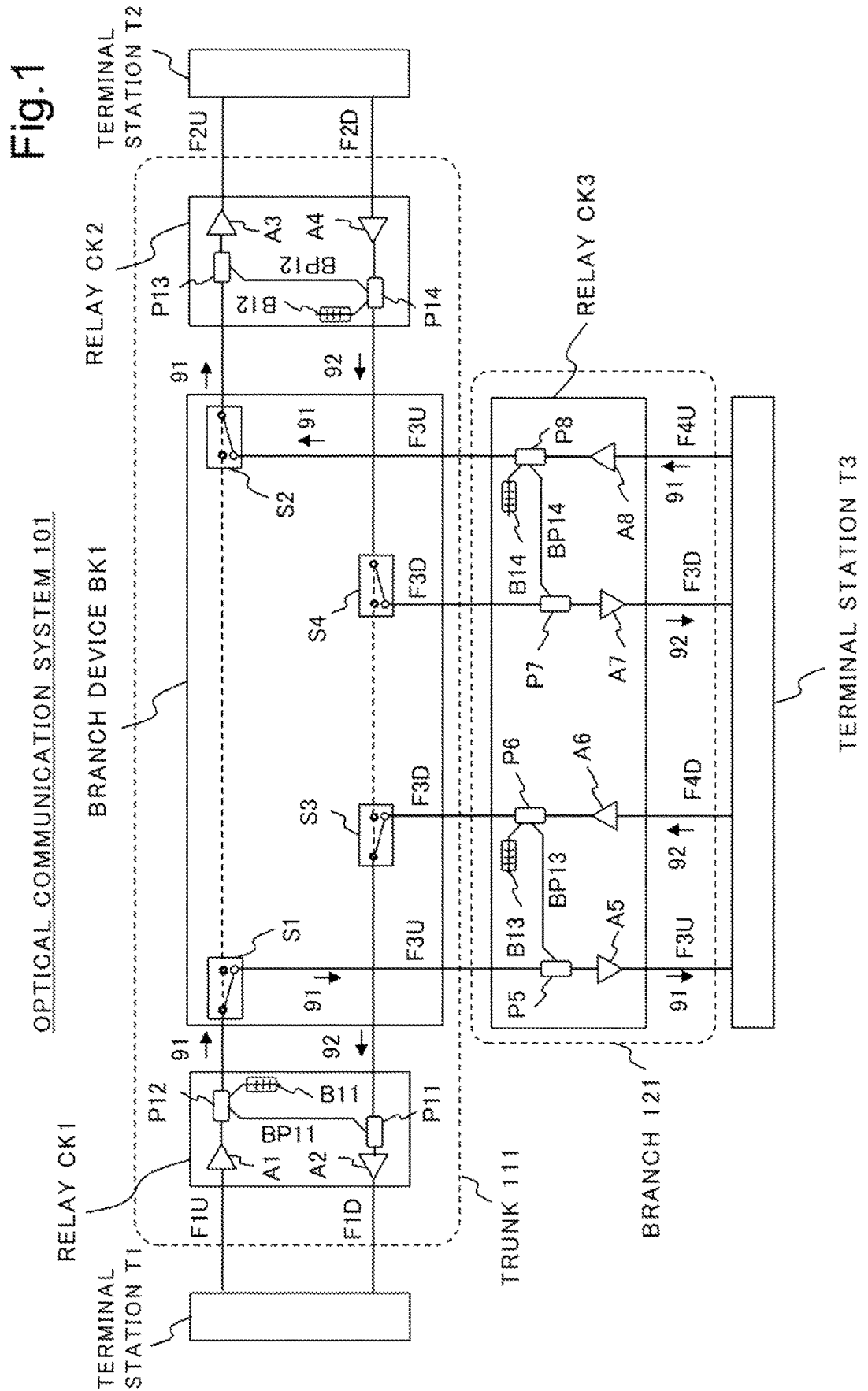
FIG. 1 is a schematic diagram illustrating a configuration example of a general optical communication system.

The optical communication system 101 in FIG. 2 does not include the wavelength selection reflectors B11 to B14, the optical couplers P5 to P8 and P11 to P14, and the optical fiber core wires BP11 to BP14 that are included in the optical communication system 101 in FIG. 1. Further, a branch device BK1 in FIG. 2 includes optical circulators C1 to C4, optical couplers P1 to P4, wavelength selection reflectors B1 to B4, and optical fiber core wires BP1 to BP4 in addition to the configuration included in the branch device BK1 in FIG. 1.

Next, traveling of an optical signal in the optical communication system 101 will be described.

Figures 3A, 3B, 3C, 3D, 3E, 3F:
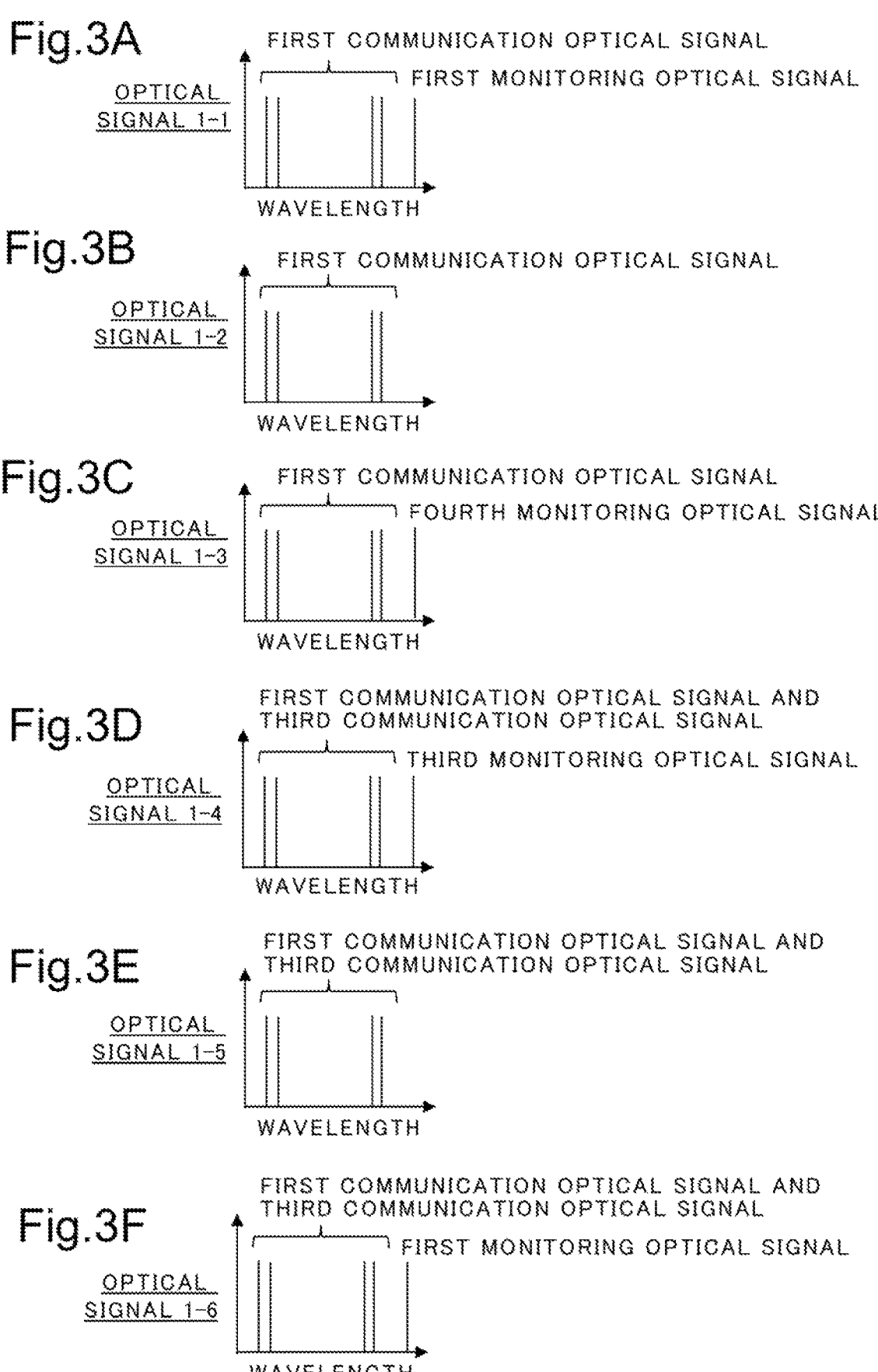
FIG. 3A is an image diagram (part 1) illustrating wavelength dependence of presence or absence of an optical signal of the optical signal 1-1.
FIG. 3B is an image diagram (part 1) illustrating wavelength dependence of presence or absence of an optical signal of the optical signal 1-2.
FIG. 3C is an image diagram (part 1) illustrating wavelength dependence of presence or absence of an optical signal of the optical signal 1-3.
FIG. 3D is an image diagram (part 1) illustrating wavelength dependence of presence or absence of an optical signal of the optical signal 1-4.
FIG. 3E is an image diagram (part 1) illustrating wavelength dependence of presence or absence of an optical signal of the optical signal 1-5.
FIG. 3F is an image diagram (part 1) illustrating wavelength dependence of presence or absence of an optical signal of the optical signal 1-6.
Figure 5A:
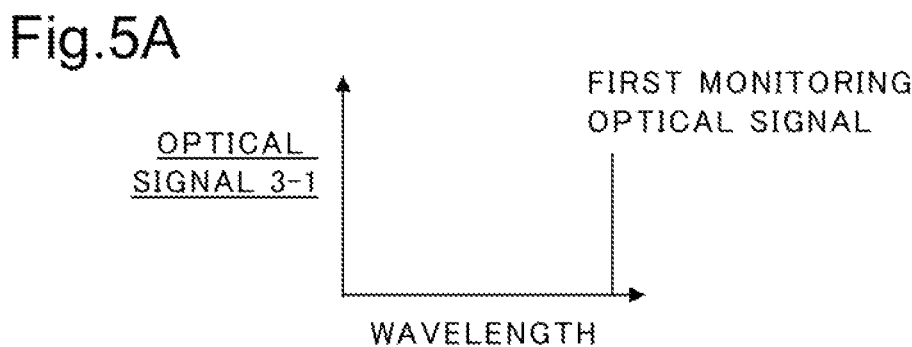
FIG. 5A is an image diagram (part 3) illustrating wavelength dependence of presence or absence of an optical signal of the optical signal 3-1.
Figure 5B:
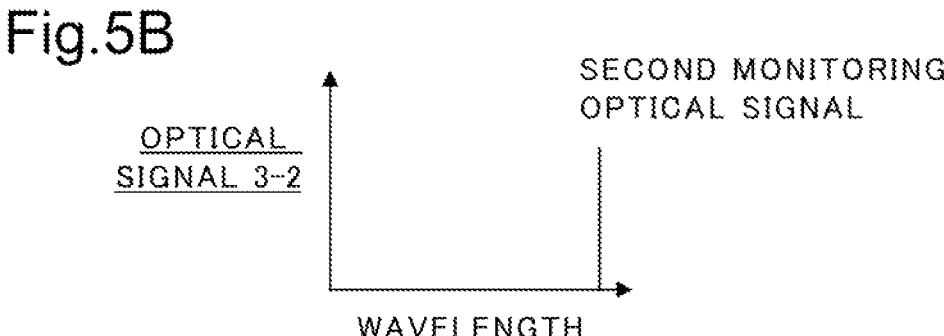
FIG. 5B is an image diagram (part 3) illustrating wavelength dependence of presence or absence of an optical signal of the optical signal 3-2.
Figure 5C:
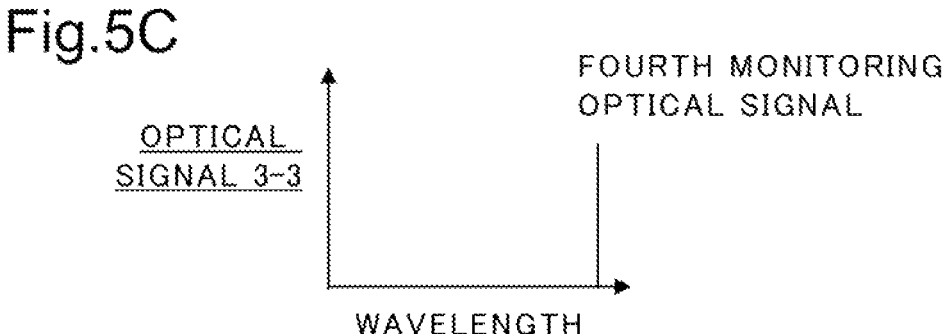
FIG. 5C is an image diagram (part 3) illustrating wavelength dependence of presence or absence of an optical signal of the optical signal 3-3.
Figure 5D:
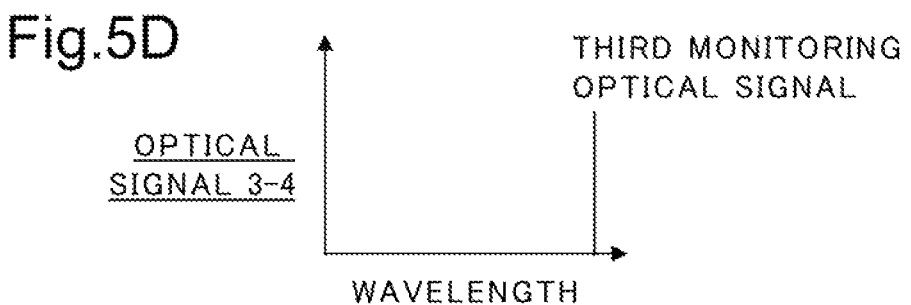
FIG. 5D is an image diagram (part 3) illustrating wavelength dependence of presence or absence of an optical signal of the optical signal 3-4.

In the optical communication system 101, an optical signal 1-1 is sent from a terminal station T1 to an optical fiber core wire F1U. The optical signal 1-1 is an optical signal acquired by superimposing, on a first communication optical signal (associated with the communication optical signal 91 in FIG. 1) being an optical signal for communication, an optical signal for monitoring (first monitoring optical signal) having a wavelength longer than a band of the first communication optical signal. The optical signal 1-1 has wavelength dependence of presence or absence of a signal as in FIG. 3A, for example. In FIG. 3A, a wavelength in which a vertical line is described represents that an optical signal having the wavelength is included in an optical signal. This point is also similar in the other drawings of FIGS. 3A to 5D.

The optical signal 1-1 is amplified by an optical amplifier A1, passes through an optical switch S1, and travels through an optical fiber core wire F3U. The optical signal 1-1 is incident on the wavelength selection reflector B1. The wavelength selection reflector B1 reflects the first monitoring optical signal included in the optical signal 1-1, and passes the first communication optical signal. The wavelength selection reflector B1 is configured to reflect light having a wavelength of the first monitoring optical signal included in the optical signal 1-1, and pass the first communication optical signal having a wavelength lower than that of the first monitoring optical signal. Since such a wavelength selection reflector is known, detailed description thereof is omitted here. The point is also similar to another wavelength selection reflector described below.

The first monitoring optical signal reflected by the wavelength selection reflector B1 is incident on the optical fiber core wire BP1 by the optical circulator C1, and travels as an optical signal 3-1 toward the right. Wavelength dependence of presence or absence of a signal of the optical signal 3-1 is as in FIG. 5A, for example.

An optical signal 1-2 being an optical signal passing through the wavelength selection reflector B1 travels downward through the optical fiber core wire F3U. Wavelength dependence of presence or absence of a signal of the optical signal 1-2 is as in FIG. 3B, for example.

An optical signal 3-3 traveling through the optical fiber core wire BP3 is superimposed on the optical signal 1-2 by the optical coupler P2. As described below, the optical signal 3-3 is a fourth monitoring optical signal being reflected by the wavelength selection reflector B2 and sent from a terminal station T3 to an optical fiber core wire F4D. Wavelength dependence of presence or absence of a signal of the optical signal 3-3 is as in FIG. 5C, for example.

Wavelength dependence of presence or absence of a signal of an optical signal 1-3 acquired by superimposing the optical signal 3-3 on the optical signal 1-2 is as in FIG. 3C, for example. The optical signal 1-3 travels downward through the optical fiber core wire F3U, is amplified by an optical amplifier A5, and then reaches the terminal station T3. The terminal station T3 receives the first communication optical signal included in the optical signal 1-3 that has reached through the optical fiber core wire F3U. Then, the terminal station T3 sends, to an optical fiber core wire F4U, an optical signal 1-4 acquired by superimposing a third communication optical signal being a communication optical signal sent from the terminal station T3 toward a terminal station T2 and a third monitoring optical signal for a purpose of monitoring an optical path on the same optical signal as the received first communication optical signal.

Wavelength dependence of presence or absence of a signal of the optical signal 1-4 being sent from the terminal station T3 is as in FIG. 3D, for example. The optical signal 1-4 travels through the optical fiber core wire F4U, is amplified by an optical amplifier A8, and is then incident on the wavelength selection reflector B4. The wavelength selection reflector B4 reflects the third monitoring optical signal included in the optical signal 1-4, and passes the first communication optical signal and the third communication optical signal. The third monitoring optical signal reflected by the wavelength selection reflector B1 is incident on the optical fiber core wire BP4 by the optical circulator C4, and travels as an optical signal 3-4 toward the left.

An optical signal 1-5 being an optical signal passing through the wavelength selection reflector B4 travels upward through the optical fiber core wire F4U. Wavelength dependence of presence or absence of a signal of the optical signal 1-5 is as in FIG. 3E, for example.

The above-described optical signal 3-3 traveling through the optical fiber core wire BP1 is superimposed on the optical signal 1-5 by the optical coupler P4, and becomes an optical signal 1-6. As described above, the optical signal 3-1 is the first monitoring optical signal from the terminal station T1 being reflected by the wavelength selection reflector B1. Wavelength dependence of presence or absence of a signal of the optical signal 1-6 is as in FIG. 3F, for example.

The optical signal 1-6 is amplified by an optical amplifier A3 and reaches the terminal station T2.

Traveling of an optical signal being sent from the terminal station T2 to an optical fiber core wire F2D is similar to that of an optical signal being sent from the terminal station T1 to the optical fiber core wire F1U.

In other words, an optical signal 2-1 acquired by superimposing, on a second communication optical signal (associated with the communication optical signal 92 in FIG. 1), a second monitoring optical signal having a wavelength longer than the second communication optical signal is sent from the terminal station T2 to the optical fiber core wire F2D. The optical signal 2-1 has wavelength dependence of presence or absence of a signal as in FIG. 4A, for example.

The optical signal 2-1 is amplified by an optical amplifier A4, passes through an optical switch S4, and travels through an optical fiber core wire F3D. The optical signal 2-1 is incident on the wavelength selection reflector B3. The wavelength selection reflector B3 reflects the second monitoring optical signal included in the optical signal 2-1, and passes the second communication optical signal. The second monitoring optical signal reflected by the wavelength selection reflector B3 is incident on the optical fiber core wire BP2 by the optical circulator C3, and travels as an optical signal 3-2 toward the left. Wavelength dependence of presence or absence of a signal of the optical signal 3-2 is as in FIG. 5B, for example.

An optical signal 2-2 being an optical signal passing through the wavelength selection reflector B3 travels downward through the optical fiber core wire F3D. Wavelength dependence of presence or absence of a signal of the optical signal 2-2 is as in FIG. 4B, for example.

The optical signal 3-4 traveling through the optical fiber core wire BP4 is superimposed on the optical signal 2-2 by the optical coupler P3. As described above, the optical signal 3-4 is the third monitoring optical signal from the terminal station T3 being reflected by the wavelength selection reflector B4. Wavelength dependence of presence or absence of a signal of the optical signal 3-4 is as in FIG. 5D, for example.

Wavelength dependence of presence or absence of a signal of an optical signal 2-3 acquired by superimposing the optical signal 3-4 on the optical signal 2-2 is as in FIG. 4C, for example. The optical signal 2-3 travels downward through the optical fiber core wire F3D, is amplified by an optical amplifier A7, and then reaches the terminal station T3. The terminal station T3 receives the second communication optical signal included in the optical signal 2-3. The terminal station T3 sends, to an optical fiber core wire F4D, an optical signal 2-4 acquired by superimposing a fourth communication optical signal and the fourth monitoring optical signal sent from the terminal station T3 toward the terminal station T1 on the same optical signal as the second communication optical signal.

Wavelength dependence of presence or absence of a signal of the optical signal 2-4 being sent from the terminal station T3 is as in FIG. 4D, for example. The optical signal 2-4 travels through the optical fiber core wire F4D, is amplified by an optical amplifier A6, and is then incident on the wavelength selection reflector B2. The wavelength selection reflector B2 reflects the fourth monitoring optical signal included in the optical signal 2-4, and passes the second communication optical signal. The fourth monitoring optical signal reflected by the wavelength selection reflector B2 is incident on the optical fiber core wire BP3 by the optical circulator C2, and travels as the optical signal 3-3 toward the left.

An optical signal 2-5 being an optical signal passing through the wavelength selection reflector B2 travels upward through the optical fiber core wire F4D. Wavelength dependence of presence or absence of a signal of the optical signal 2-5 is as in FIG. 4E, for example.

The above-described optical signal 3-2 traveling through the optical fiber core wire BP2 is superimposed on the optical signal 2-5 by the optical coupler P1, and becomes an optical signal 2-6. As described above, the optical signal 3-2 is the second monitoring optical signal from the terminal station T2 being reflected by the wavelength selection reflector B3. Wavelength dependence of presence or absence of a signal of the optical signal 2-6 is as in FIG. 4F, for example.

The optical signal 2-6 is amplified by an optical amplifier A2 and reaches the terminal station T1.

Next, in consideration of the flow of the optical signal described above, a monitoring method of an optical path being performed in the optical communication system 101 in FIG. 2 will be described.

Figure 6:
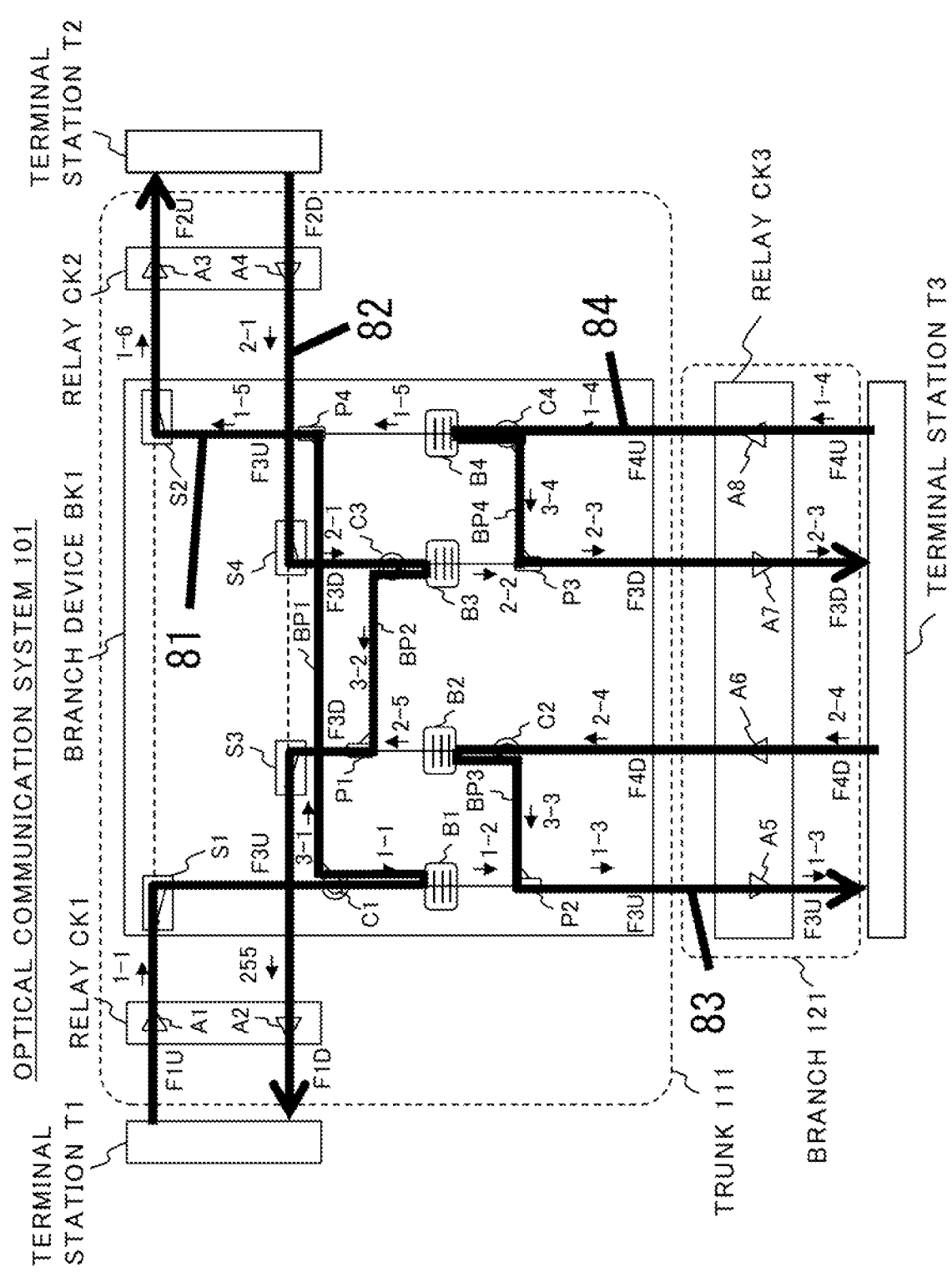
FIG. 6 is an image diagram (part 1) illustrating a monitoring method of an optical path.

FIG. 6 is an image diagram illustrating the monitoring method of an optical path being performed in the optical communication system 101 in FIG. 2 with the flow of the monitoring optical signal described above as a premise. In the optical communication system 101, for each of four optical paths associated with each of arrows 81 to 84, intensity of the monitoring optical signal passing through the optical path is monitored.

For the optical path indicated by the arrow 81, the terminal station T2 monitors intensity of the first monitoring optical signal described above being sent from the terminal station T1. Further, for the optical path indicated by the arrow 82, the terminal station T1 monitors intensity of the second monitoring optical signal described above being sent from the terminal station T2. Further, for the optical path indicated by the arrow 83, the terminal station T3 monitors intensity of the fourth monitoring optical signal described above being sent from the terminal station T3. Further, for the optical path indicated by the arrow 84, the terminal station T3 monitors intensity of the third monitoring optical signal described above being sent from the terminal station T3.

In this way, in the optical communication system in FIG. 2, the terminal stations T1 and T2 being terminal stations on a trunk 111 side monitor intensity of an optical signal passing through an optical path on the trunk 111 side. Further, the terminal station T3 being a terminal station on a branch 121 side monitors intensity of an optical signal passing through an optical path on the branch 121 side.

In the optical communication system in FIG. 2, the monitoring optical signal sent from the terminal stations T1 and T2 being the terminal stations on the trunk 111 side does not reach the branch 121 side over the branch device BK1 and does not also reach the terminal station T3. Further, the monitoring optical signal sent from the terminal station T3 being the terminal station on the branch 121 side does not reach the trunk 111 over the branch device BK1 and does not also reach the terminal stations T1 and T2.

Thus, in the optical communication system 101 in FIG. 2, a wavelength of the monitoring optical signal to be sent can be made common to the terminal stations T1 and T2 being the terminal stations on the trunk 111 side and the terminal station T3 being the terminal station on the branch 121 side.

Furthermore, although not illustrated here, even when the number of branches is equal to or more than two, the monitoring optical signal being sent from the terminal station on each branch side is not sent to the other branch over the branch device of the branch. Thus, a wavelength of the monitoring optical signal to be sent can be made common in the terminal station on each branch side.

This enables simultaneous monitoring between a trunk and a branch and, furthermore, between a plurality of branches, and also facilitates commonality of parts to be used.

In the optical communication system, a plurality of optical fiber core wires may be shared in each bidirectional optical fiber core wire transmission path that connects terminal stations in such a way that an increase in a communication capacity can be handled. Such an optical communication system is disclosed in Japanese Patent Application No. 2019-061901 described in the section of [Background Art]. The configuration and the monitoring method for monitoring an optical path being described with reference to FIGS. 2 to 6 are also applicable to such an optical communication system.

Figure 7:
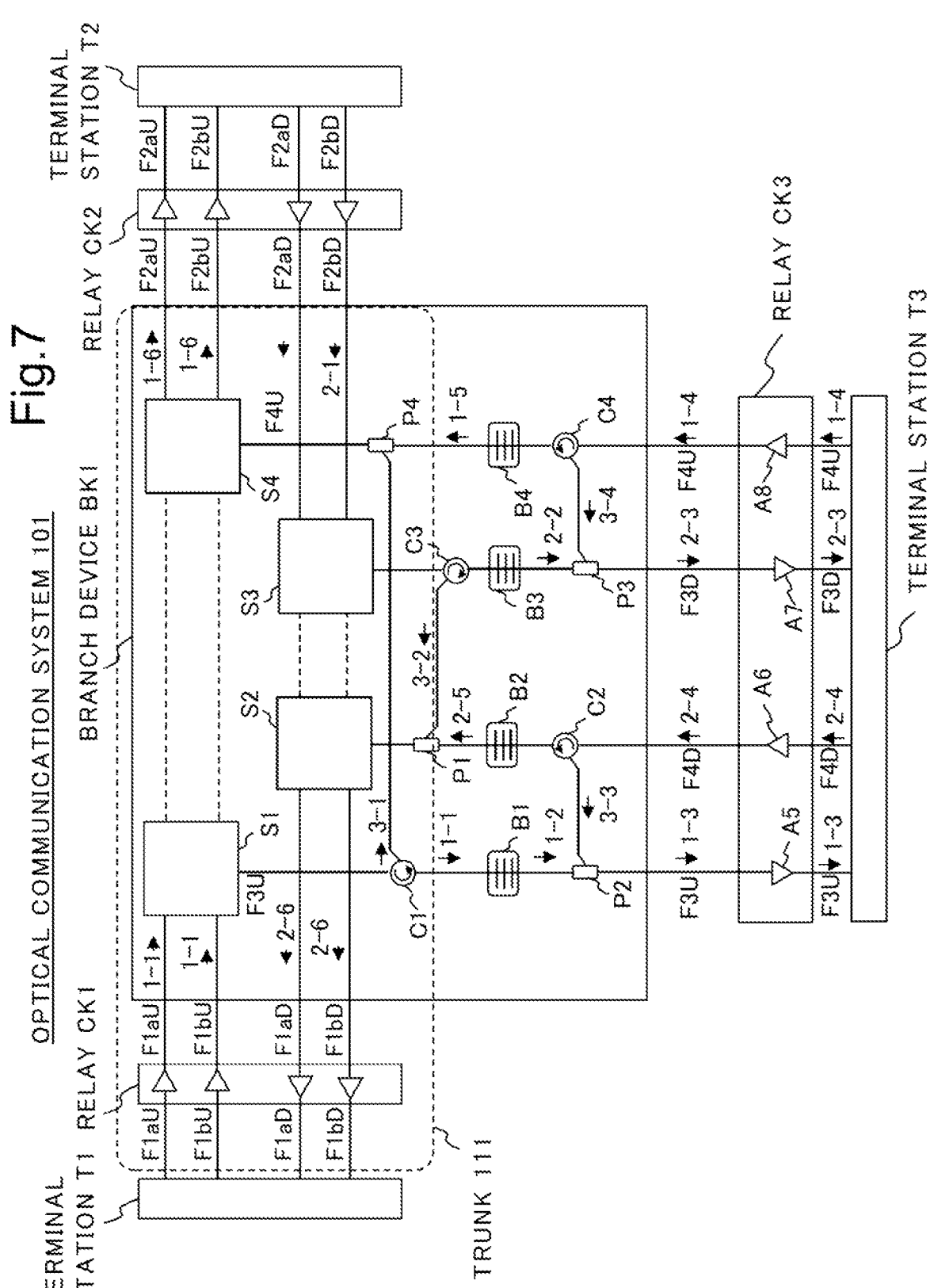
FIG. 7 is a schematic diagram illustrating a configuration example (part 2) of the optical communication system according to the present example embodiment.

FIG. 7 is a schematic diagram illustrating the optical communication system 101 having a configuration for monitoring an optical path in the present example embodiment, and including a plurality of optical fiber core wires shared in each bidirectional optical communication transmission path that connects terminal stations.

In the optical communication system 101, an optical fiber core wire F1*a*U and an optical fiber core wire F1*b*U are shared. Further, optical fiber core wires F1*a*D and F1*b*D are shared. Further, an optical fiber core wire F2*a*U and an optical fiber core wire F2*b*U are shared. Further, optical fiber core wires F2*a*D and F2*b*D are shared. A configuration example and an operation example of the optical switches S1 to S4 are described in Japanese Patent Application No. 2019-061901, and detailed description thereof is omitted here.

The description of the optical communication system 101 in FIG. 7 except for the description above is similar to the description of the optical communication system 101 in FIG.

2. Further, a way of monitoring an optical path in the optical communication system 101 in FIG. 7 is similar to that illustrated in FIG. 6. Therefore, detailed description thereof is omitted here.

Figure 8:
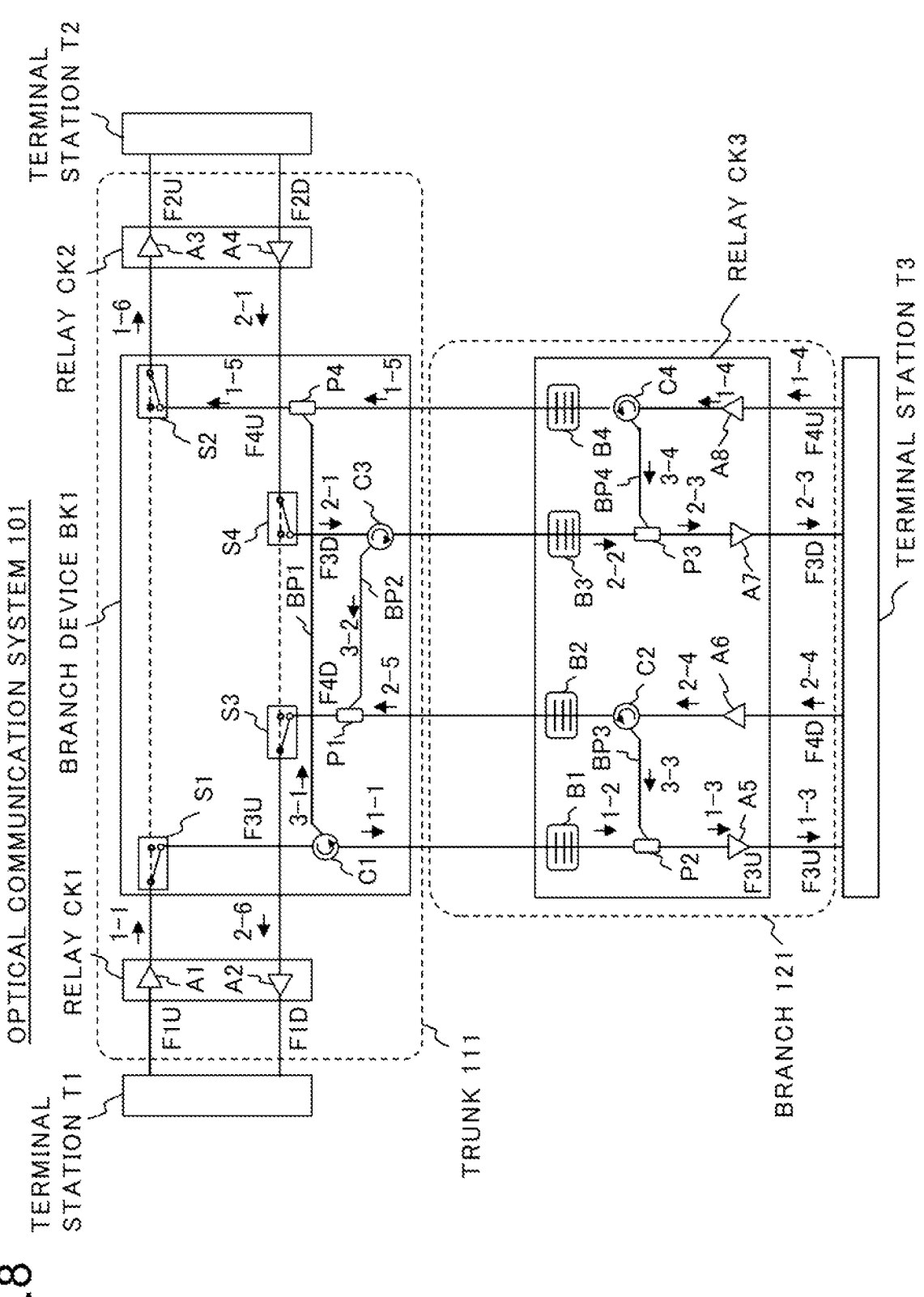
FIG. 8 is a schematic diagram illustrating a configuration example (part 3) of the optical communication system according to the present example embodiment.

A part of the configuration included in the branch device BK1 in the optical communication system 101 in FIG. 7 can be included in the relay CK3 of the branch 121 instead of the branch device BK1 as in FIG. 8. In the optical communication system 101 in FIG. 8, the relay CK3 includes the wavelength selection reflectors B1 to B4, the optical circulators C2 and C4, the optical couplers P2 and P3, and the optical fiber core wires BP3 and BP4. The configuration is included in the branch device BK1 in the optical communication system 101 in FIG. 2. Also in the optical communication system 101 in FIG. 8, similarly to that in FIG. 7, the first and second monitoring optical signals do not reach the terminal station T3, and the third and fourth monitoring optical signals do not reach the terminal stations T1 and T2. Thus, also in the optical communication system 101 in FIG. 8, similarly to that in FIG. 7, commonality of a wavelength of the first and second monitoring optical signals and the third and fourth monitoring optical signals can also be achieved at a time of simultaneous monitoring.

A configuration for causing the first and second monitoring optical signals not to reach the terminal station T3 and causing the third and fourth monitoring optical signals not to reach the terminal stations T1 and T2 does not necessarily need to include an optical circulator.

Figure 9:
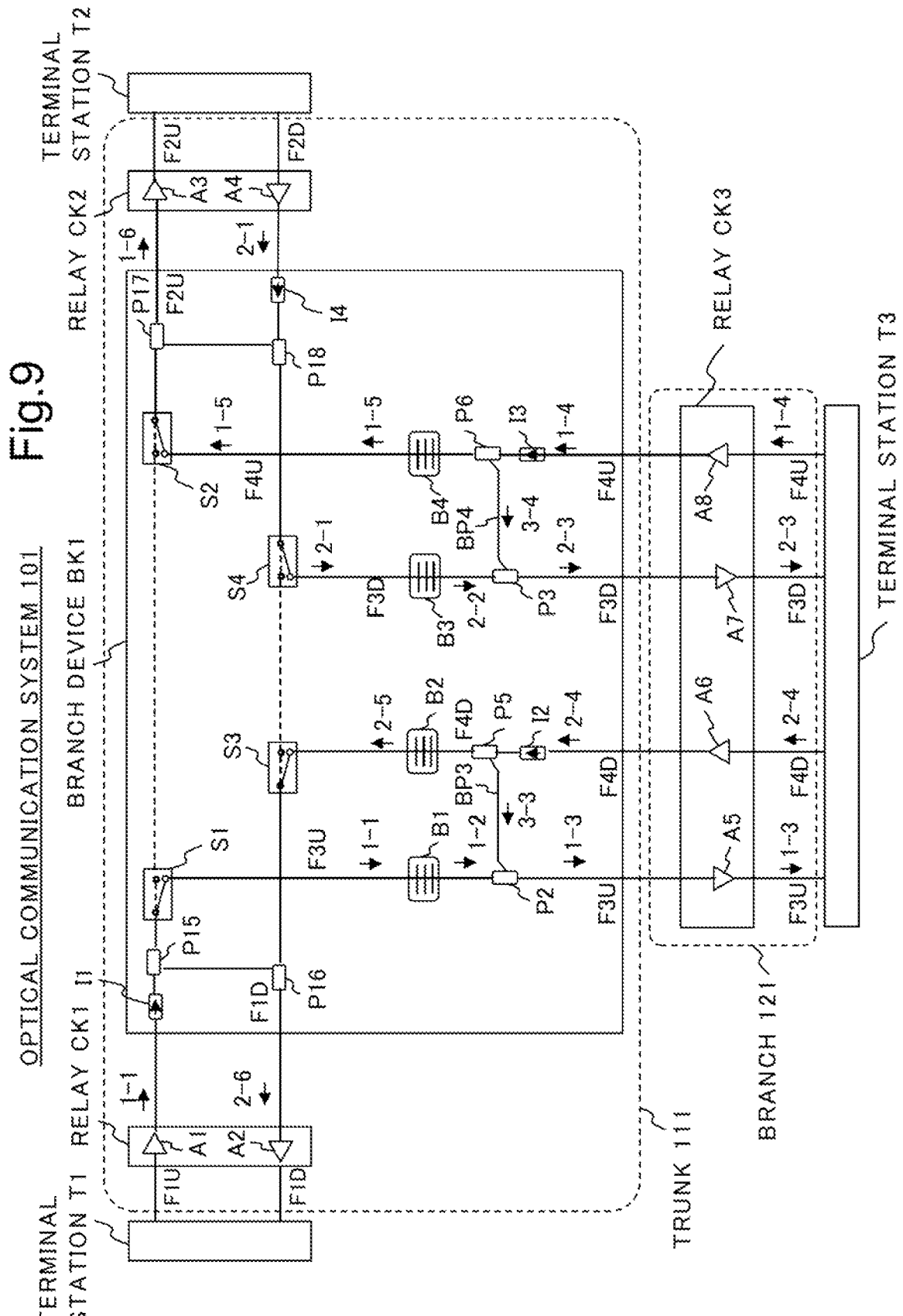
FIG. 9 is a schematic diagram illustrating a configuration example (part 4) of the optical communication system according to the present example embodiment.

FIG. 9 is a schematic diagram illustrating the optical communication system 101 not including an optical circulator and being an example of an optical communication system according to the present example embodiment. Hereinafter, traveling of the monitoring optical signal in the optical communication system 101 in FIG. 9 will be described. Note that traveling of the communication optical signal in the optical communication system 101 in FIG. 9 is similar to that in the optical communication system 101 in FIG. 2, and thus detailed description thereof will be omitted.

The first monitoring optical signal included in the optical signal 1-1 being sent from the terminal station T1 to the optical fiber core wire F1U travels downward through the optical fiber core wire F3U via an optical isolator I1, the optical coupler P15, and the optical switch S1, and is incident on the wavelength selection reflector B1. The first monitoring optical signal is reflected by the wavelength selection reflector B1, travels upward through the optical fiber core wire F3U, and passes through the optical switch S1, and then a part thereof is taken out by the optical coupler P15 and is incident on the optical fiber core wire F1D by the optical coupler P16. The rest of the first monitoring optical signal that is not taken out by the optical coupler P15 is incident on the optical isolator I1 in a direction opposite to a passage direction and is interrupted.

The first monitoring optical signal incident on the optical fiber core wire F1D by the optical coupler P16 reaches the terminal station T1 via the optical amplifier A2. The terminal station T1 monitors, by intensity of the first monitoring optical signal, an optical path through which the first monitoring optical signal passes.

Further, the second monitoring optical signal included in the optical signal 2-1 being sent from the terminal station T2 to the optical fiber core wire F2D travels downward through the optical fiber core wire F3D via the optical amplifier A4, an optical isolator I4, the optical coupler P18, and the optical switch S4, and is reflected by the wavelength selection reflector B3. Then, the reflected second monitoring optical signal travels upward through the optical fiber core wire F3D, and passes through the optical switch S4, and then a part thereof is taken out by the optical coupler P18 and is incident on the optical fiber core wire F2U by the optical coupler P17. The rest of the second monitoring optical signal that is not taken out by the optical coupler P18 is incident on the optical isolator I4 in a direction opposite to a passage direction and is interrupted.

The second monitoring optical signal incident on F2U by the optical coupler P17 reaches the terminal station T2 via the optical amplifier A3. The terminal station T2 monitors, by intensity of the second monitoring optical signal, an optical path through which the second monitoring optical signal passes.

The third monitoring optical signal included in the optical signal 1-4 being sent from the terminal station T3 to the optical fiber core wire F4U is reflected by the wavelength selection reflector B4 via the optical amplifier A8, an optical isolator I3, and the optical coupler P6. The reflected third monitoring optical signal travels downward through the optical fiber core wire F4U, and a part thereof is taken out by the optical coupler P6 and is incident on the optical fiber core wire F3D by the optical coupler P3. The rest of the third monitoring optical signal that is not taken out by the optical coupler P6 is incident on the optical isolator I3 in a direction opposite to a passage direction and is interrupted.

The third monitoring optical signal incident on the optical fiber core wire F3D by the optical coupler P3 reaches the terminal station T3 via the optical amplifier A7. The terminal station T3 monitors, by intensity of the third monitoring optical signal, an optical path through which the third monitoring optical signal passes.

The fourth monitoring optical signal included in the optical signal 2-4 being sent from the terminal station T3 to the optical fiber core wire F4D is reflected by the wavelength selection reflector B2 via the optical amplifier A6, an optical isolator I2, and the optical coupler P5. The reflected fourth monitoring optical signal travels downward through the optical fiber core wire F4D, and a part thereof is taken out by the optical coupler P5 and is incident on the optical fiber core wire F3U by the optical coupler P2. The rest of the fourth monitoring optical signal that is not taken out by the optical coupler P5 is incident on the optical isolator I2 in a direction opposite to a passage direction and is interrupted.

The fourth monitoring optical signal incident on F3U by the optical coupler P2 reaches the terminal station T3 via the optical amplifier A5. The terminal station T3 monitors, by intensity of the fourth monitoring optical signal, an optical path through which the fourth monitoring optical signal passes.

Note that a combination of the optical isolator I1, the optical couplers P15 and P16, and an optical fiber core wire between the optical coupler P15 and the optical coupler P16 in FIG. 9 may be installed closer to the terminal station T1 outside the branch device BK1. The combination may be installed in the relay CK1, for example.

Further, a combination of the optical isolator I2, the optical couplers P17 and P18, and an optical fiber core wire between the optical coupler P17 and the optical coupler P18 in FIG. 9 may be installed closer to the terminal station T2 outside the branch device BK1. The combination may be installed in the relay CK2, for example.

Figure 10:
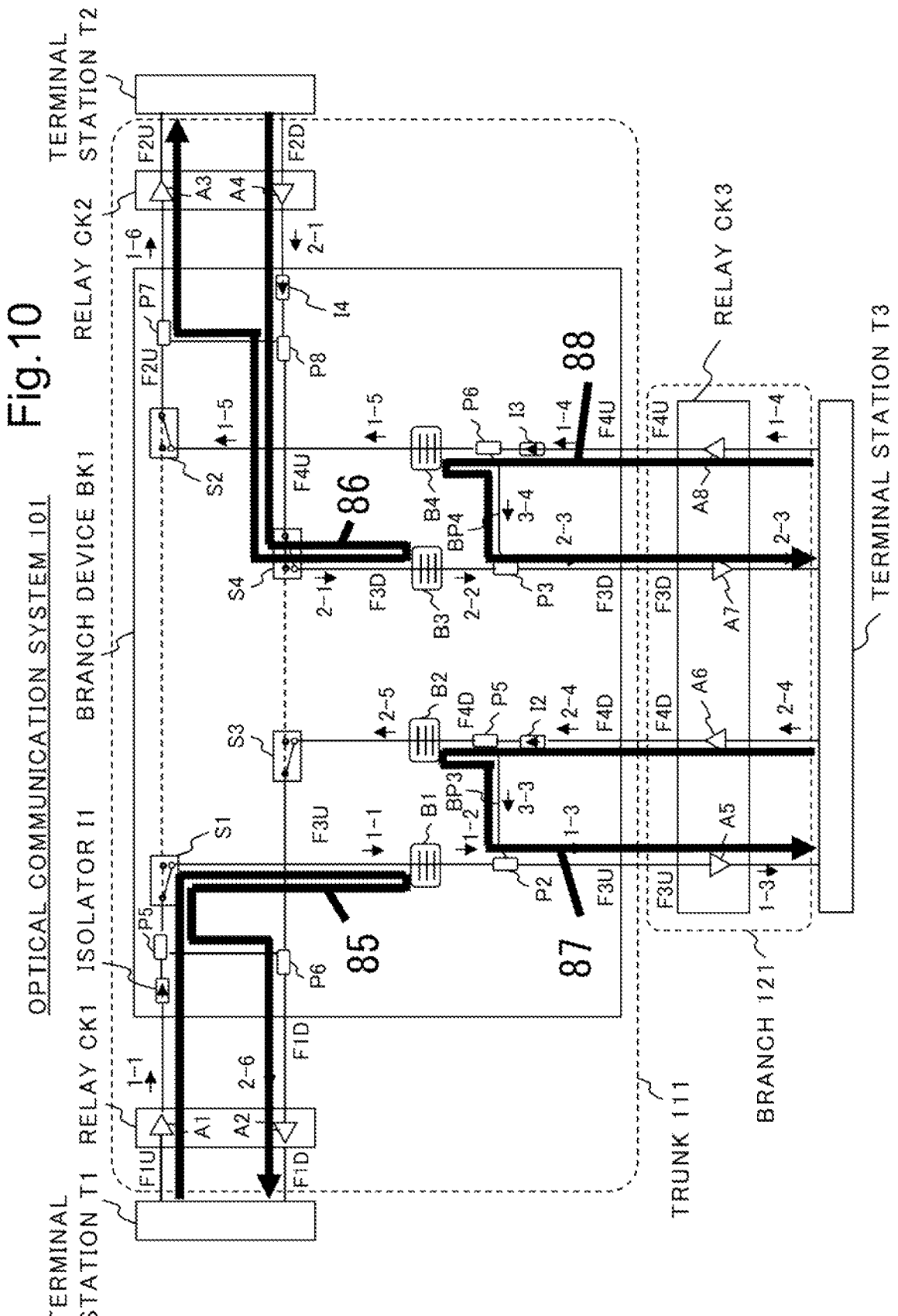
FIG. 10 is an image diagram (part 2) illustrating the monitoring method of an optical path.

FIG. 10 is an image diagram illustrating a way of monitoring in the optical communication system 101 in FIG. 9. In the optical communication system 101 in FIG. 9, for each of four optical paths associated with each of arrows 85 to 88, intensity of the monitoring optical signal passing through the optical path is monitored.

First, for the optical path indicated by the arrow 85, the terminal station T1 monitors intensity of the first monitoring optical signal described above being sent from the terminal station T1. Further, for the optical path indicated by the arrow 86, the terminal station T2 monitors intensity of the second monitoring optical signal described above being sent from the terminal station T2. Further, for the optical path indicated by the arrow 87, the terminal station T3 monitors intensity of the fourth monitoring optical signal described above being sent from the terminal station T3. Further, for the optical path indicated by the arrow 88, the terminal station T3 monitors intensity of the third monitoring optical signal described above being sent from the terminal station T3.

In this way, in the optical communication system in FIG. 9, the terminal stations T1 and T2 being terminal stations on the trunk 111 side monitor intensity of an optical signal passing through an optical path of the trunk 111. Further, the terminal station T3 being a terminal station on the branch 121 side monitors intensity of an optical signal passing through an optical path of the branch 121.

In the optical communication system in FIG. 9, the monitoring optical signal sent from the terminal stations T1 and T2 being the terminal stations on the trunk 111 side does not reach the branch 121 side over the branch device BK1 and does not also reach the terminal station T3. Further, the monitoring optical signal sent from the terminal station T3 being the terminal station on the branch 121 side does not reach the trunk 111 over the branch device BK1 and does not also reach the terminal stations T1 and T2.

Thus, in the optical communication system in FIG. 2, first, a wavelength of the monitoring optical signal to be sent can be made common to the terminal stations T1 and T2 being the terminal stations on the trunk 111 side and the terminal station T3 being the terminal station on the branch 121 side.

Furthermore, although not illustrated, even when the number of branches is equal to or more than two, the monitoring optical signal being sent from the terminal station on each branch side is not sent to the other branch over the branch device of the branch. Thus, a wavelength of the monitoring optical signal to be sent can be made common in the terminal station on each branch side.

This enables simultaneous monitoring between a trunk and a branch, and also facilitates commonality of parts to be used.

Next, a further effect achieved by a monitoring optical signal arrival adjustment device according to the present example embodiment will be described with, as an example, a case where the monitoring optical signal arrival adjustment device according to the present example embodiment is applied to an optical communication system including a plurality of branches.

Herein, the monitoring optical signal arrival adjustment device is configured to cause a communication optical signal described above from a terminal station of a trunk to reach a terminal station of a branch, but cause a monitoring optical signal not to reach the terminal station of the branch. Further, the monitoring optical signal arrival adjustment device is also configured to cause a communication optical signal from the terminal station of the branch to reach the terminal station of the trunk, but cause a monitoring optical signal not to reach the terminal station of the trunk.

The monitoring optical signal arrival adjustment device is a portion of the optical communication system 101 in FIG. 2 or 7 other than the optical switches S1 to S4 of the branch device BK1. Alternatively, the monitoring optical signal arrival adjustment device is a combination of a portion of the optical communication system 101 in FIG. 8 other than the optical switches S1 to S4 of the branch device BK1 and a portion of the relay CK3 except for the optical amplifiers A5 to A8. Alternatively, the monitoring optical signal arrival adjustment device is a portion of the optical communication system 101 in FIG. 9 other than the optical switches S1 to S4 of the branch device BK1.

Figure 11:
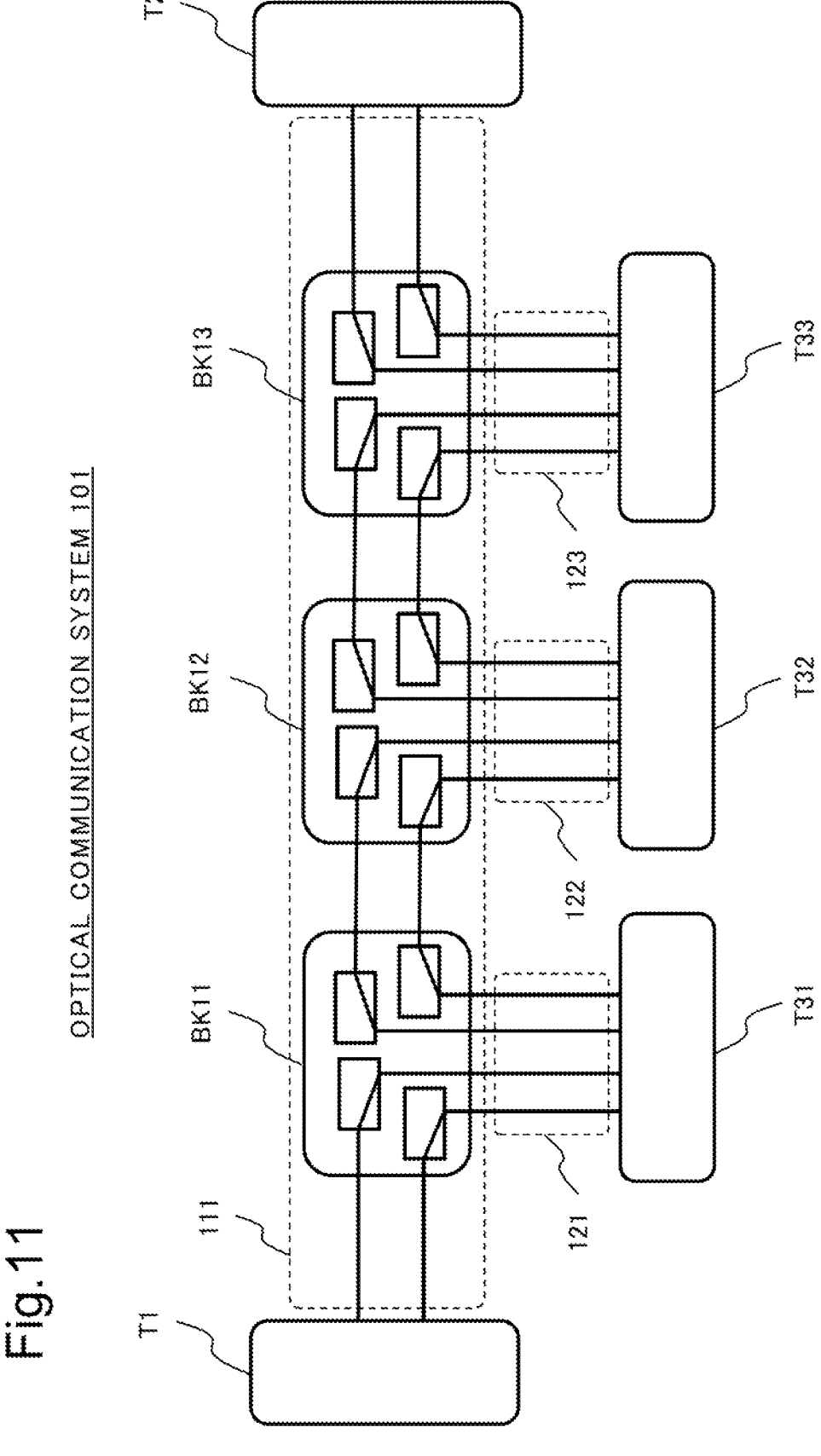
FIG. 11 is an explanatory diagram (part 1) of a further effect.

FIG. 11 is an image diagram illustrating the optical communication system 101 being an example of a general optical communication system including a plurality of branches. The optical communication system 101 in FIG. 11 includes three sets of a branch device, the branch, and a terminal station. The three sets are a set of a branch device BK11, a branch 121, and a terminal station T31, a set of a branch device BK12, a branch 122, and a terminal station T32, and a set of a branch device BK13, a branch 123, and a terminal station T33.

In a case of the optical communication system 101 in FIG. 11, a monitoring optical signal from the terminal station T1 reaches the terminal station T31. Further, a monitoring optical signal from the terminal station T31 reaches the terminal stations T1 and T32. Further, a monitoring optical signal from the terminal station T32 reaches the terminal stations T31 and T33. Further, a monitoring optical signal from the terminal station T33 reaches the terminal stations T32 and T2.

In the optical communication system 101, each of the terminal stations monitors, by intensity of a monitoring optical signal that has reached the terminal station, an optical communication path through which the monitoring optical signal passes. For example, for an optical communication path between the terminal station T1 and the terminal station T31, the terminal station T31 monitors an optical communication path from the terminal station T1 toward the terminal station T31 by a monitoring optical signal being sent from the terminal station T1. Further, the terminal station T1 monitors an optical communication path from the terminal station T31 toward the terminal station T1 by a monitoring optical signal being sent from the terminal station T31.

Further, for example, for an optical communication path between the terminal station T31 and the terminal station T32, the terminal station T32 monitors an optical communication path from the terminal station T31 toward the terminal station T32 by a monitoring optical signal being sent from the terminal station T31. Further, the terminal station T31 monitors an optical communication path from the terminal station T32 toward the terminal station T31 by a monitoring optical signal being sent from the terminal station T32.

Figure 12:
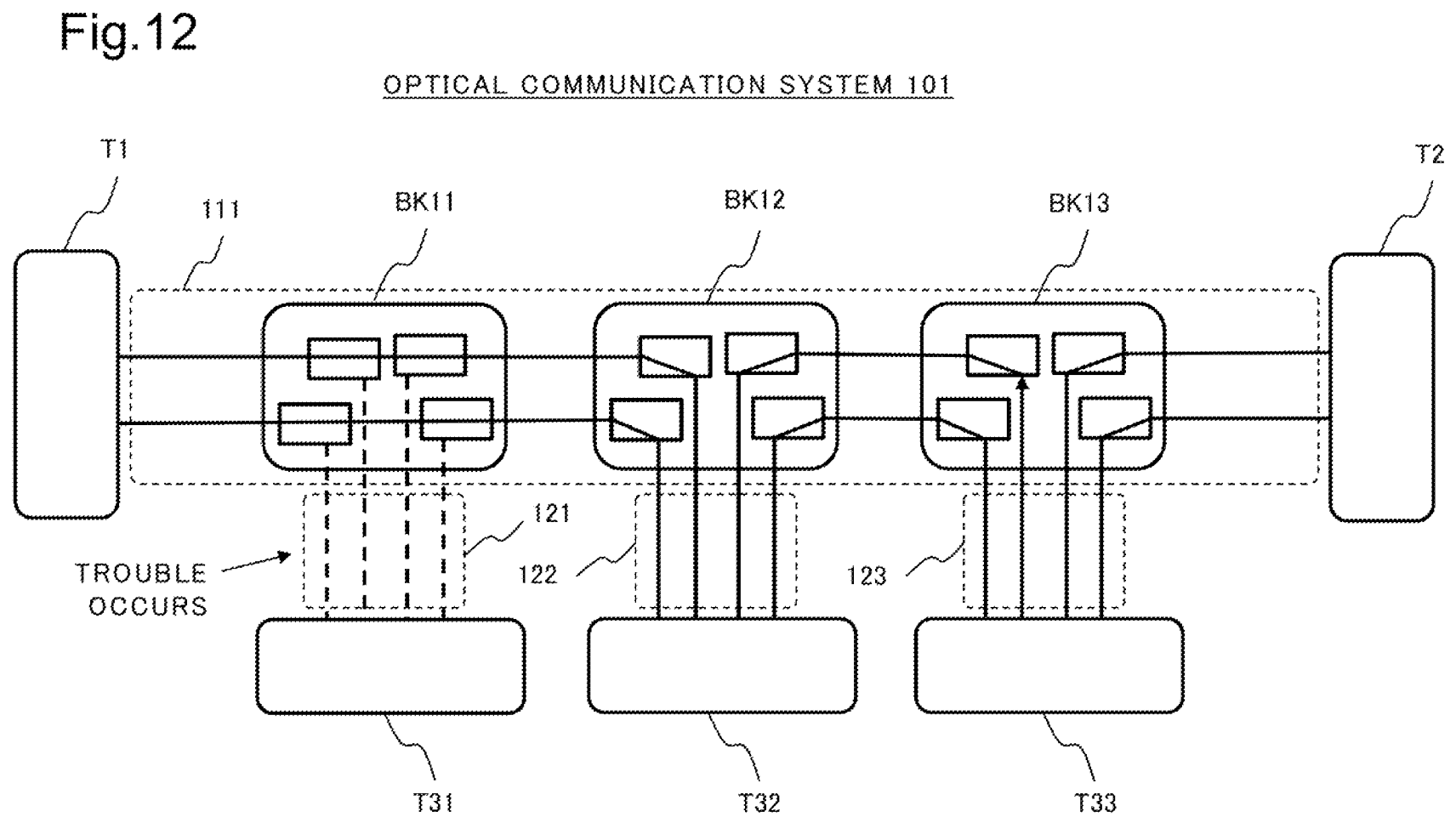

Herein, as in FIG. 12, it is assumed that trouble such as a break in a submarine optical cable in the branch 121 occurs. In that case, the branch device BK11 cuts off the branch 121, and connects the terminal station T1 to the branch device 12.

In that case, for an optical communication path between the terminal station T1 and the terminal station T32, the terminal station T32 needs to monitor an optical communication path from the terminal station T1 toward the terminal station T32 by a monitoring optical signal being sent from the terminal station T1. Further, the terminal station T1 needs to monitor an optical communication path from the terminal station T32 toward the terminal station T1 by a monitoring optical signal being sent from the terminal station T32. This means that the terminal stations T1 and T32 need to have a monitoring control function that can handle such a change in a monitoring path.

A place where trouble occurs may be the branch 122 or 123, and thus the terminal station needs to have a complicated monitoring control function that can handle the trouble at occurrence. When the number of sets of a branch device, a branch, and a terminal station is increased to equal to or more than four sets, the monitoring control function is more complicated.

Figure 13:
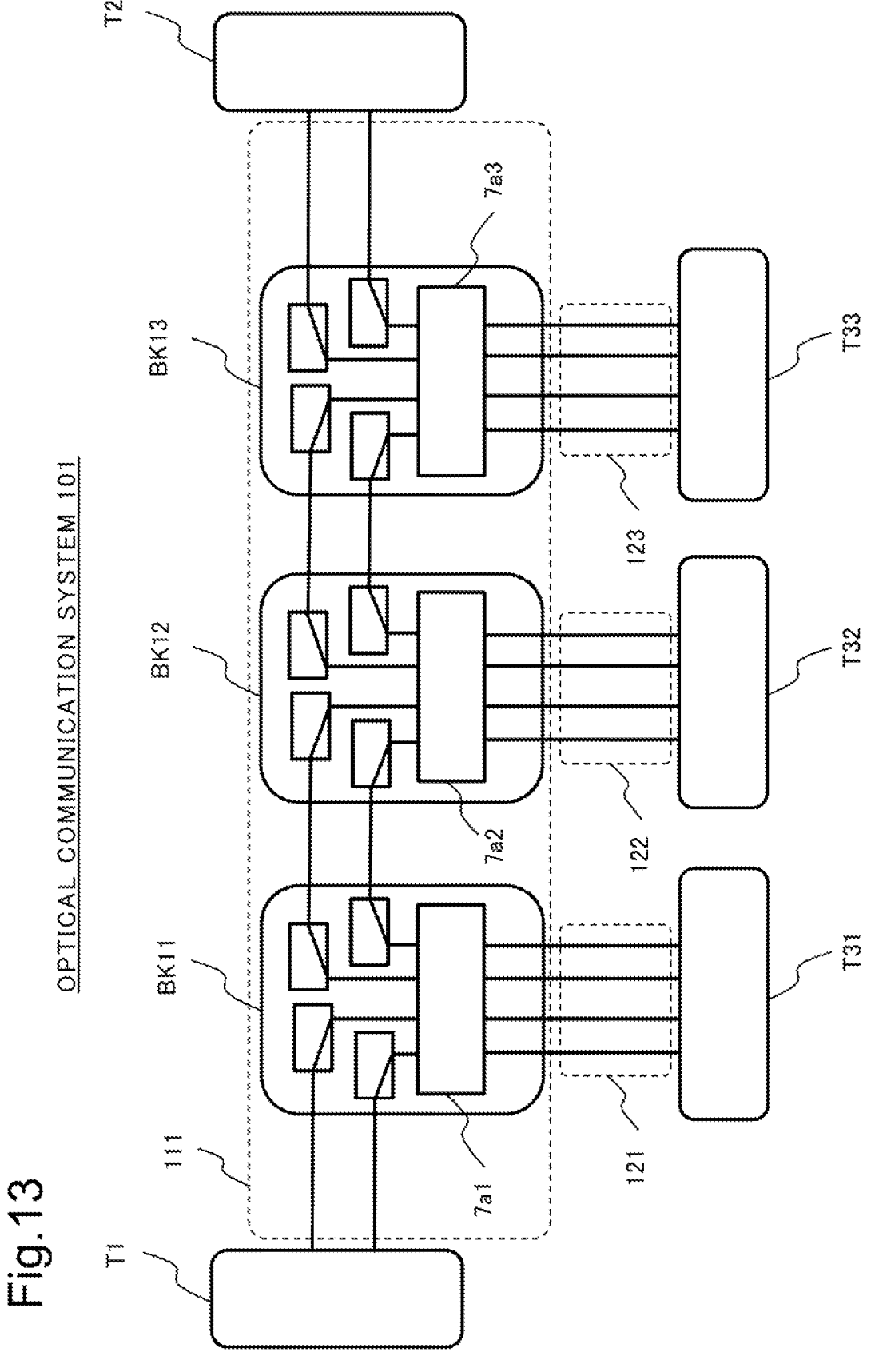
FIG. 13 is an explanatory diagram (part 3) of a further effect.

FIG. 13 is an image diagram illustrating the optical communication system 101 to which the monitoring optical signal arrival adjustment device according to the present example embodiment described above is applied. FIG. 13 is an example of a case where each branch device includes the monitoring optical signal arrival adjustment device. In other words, the branch devices BK11, BK12, and BK13 include monitoring optical signal arrival adjustment devices 7a1, 7a2, and 7a3.

In the optical communication system 101 in FIG. 13, a monitoring optical signal being sent from the terminal stations T1 and T2 does not reach the terminal stations T31 to T33 and reaches the terminal stations T2 and T1. The terminal station T2 monitors an optical path from the terminal station T1 toward the terminal station T2 by a monitoring optical signal being sent from the terminal station T1. Further, the terminal station T1 monitors an optical path from the terminal station T2 toward the terminal station T1 by a monitoring optical signal being sent from the terminal station T2.

Further, a monitoring optical signal being sent from the terminal stations T31, T32, and T33 does not reach the terminal stations T1 and T2, and returns to any of the terminal stations T31, T32, and T33 that have sent the monitoring optical signal. Each of the terminal stations T31, T32, and T33 monitors, by intensity of a monitoring optical signal being sent from the terminal station, an optical path through which the monitoring optical signal passes.

Figure 14:
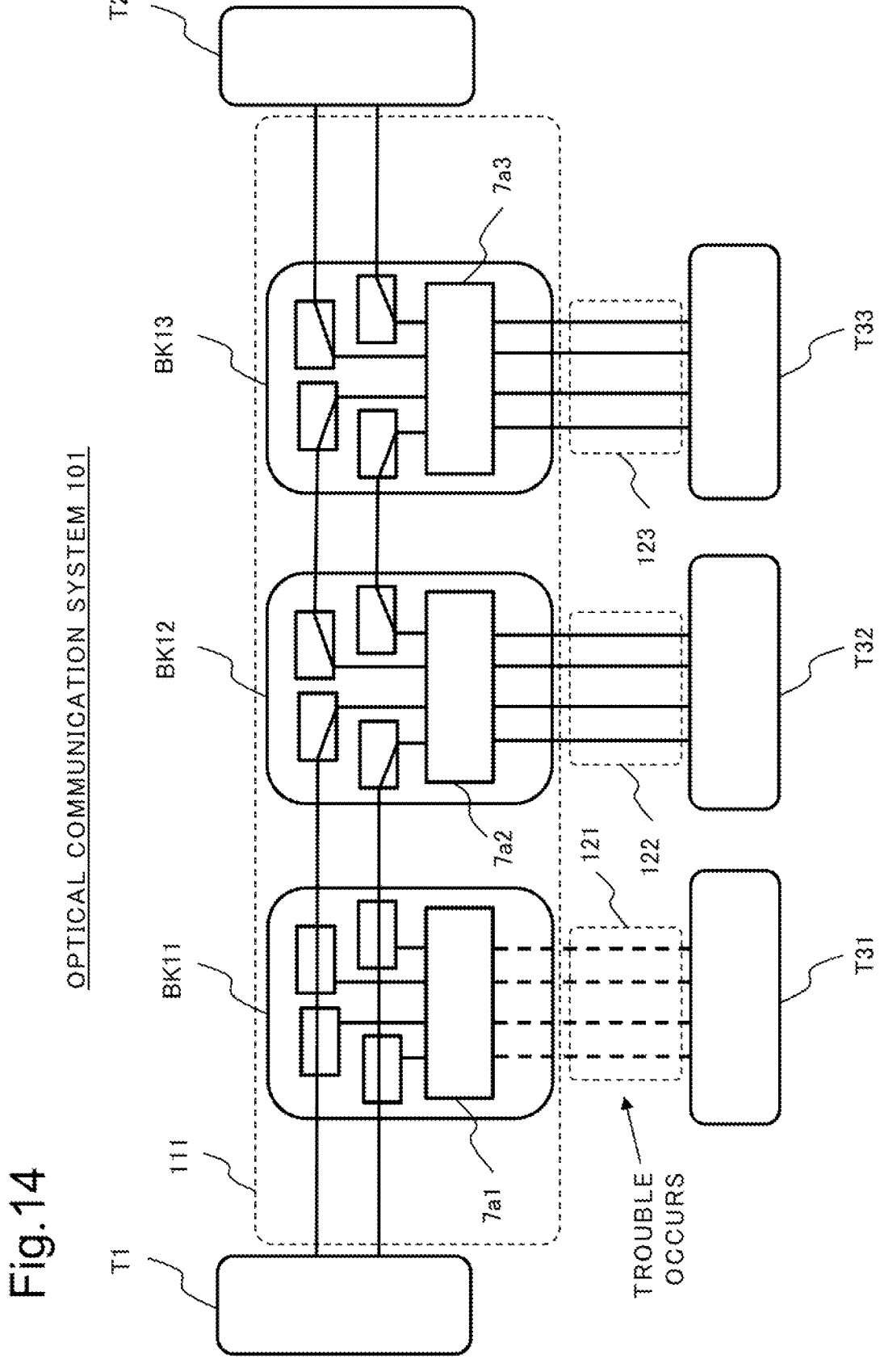
FIG. 14 is an explanatory diagram (part 4) of a further effect.

Herein, as in FIG. 14, it is assumed that trouble such as a break in an optical cable in the branch 121 occurs. In that case, the branch device BK11 cuts off connection to the branch 121, and connects the terminal station T1 to the branch device BK12.

Even in that case, a monitoring optical signal being sent from the terminal stations T1 and T2 does not reach the terminal stations T31 to T33 and reaches the terminal stations T2 and T1. The terminal station T2 monitors an optical path from the terminal station T1 toward the terminal station T2 by a monitoring optical signal being sent from the terminal station T1. Further, the terminal station T1 monitors an optical path from the terminal station T2 toward the terminal station T1 by a monitoring optical signal being sent from the terminal station T2.

Further, a monitoring optical signal being sent from the terminal stations T32 and T33 does not reach the terminal stations T1 and T2, and returns to any of the terminal stations T32 and T33 that have sent the monitoring optical signal. Each of the terminal stations T32 and T33 monitors, by intensity of a monitoring optical signal being sent from the terminal station, an optical path through which the monitoring optical signal passes.

The same also applies to a case where trouble occurs in another branch. In this way, in the optical communication system 101 in FIGS. 13 and 14, a combination of an optical path to be monitored, a terminal station that sends a monitoring optical signal used for the monitoring, and a terminal station that performs monitoring by the monitoring optical signal does not change even when trouble occurs in a branch. Thus, there is an advantage that monitoring control is simple and easy.

In other words, the monitoring optical signal arrival adjustment device according to the present example embodiment does not only enable simultaneous monitoring between a trunk and a branch and, furthermore, between a plurality of branches, and facilitate commonality of parts to be used. The monitoring optical signal arrival adjustment device according to the present example embodiment achieves an effect of making monitoring control simple and easy.

[Effect]

The optical communication system according to the present example embodiment is configured in such a way that a monitoring optical signal that passes through an optical path of a trunk is not sent to a branch over a branch device. Further, the optical communication system is configured in such a way that a monitoring optical signal that passes through an optical communication path of the branch is not sent to a trunk side over the branch device.

Thus, as described above, in the optical communication system according to the present example embodiment, a wavelength (frequency) of the monitoring optical signal to be sent can be made common to a terminal station on the trunk side and a terminal station on a branch side. Furthermore, even when the number of branches is equal to or more than two, the monitoring optical signal being sent from the terminal station on each branch side is not sent to the other branch over the branch device of the branch. Thus, a wavelength (frequency) of the monitoring optical signal to be sent can be made equal in the terminal station on each branch side. In this way, the optical communication system according to the present example embodiment enables simultaneous monitoring between the trunk and the branch and, furthermore, between the plurality of branches, and also facilitates commonality of parts to be used.

In addition, as described above, the optical communication system according to the present example embodiment achieves an effect of making monitoring control simple and easy.

Figure 15:
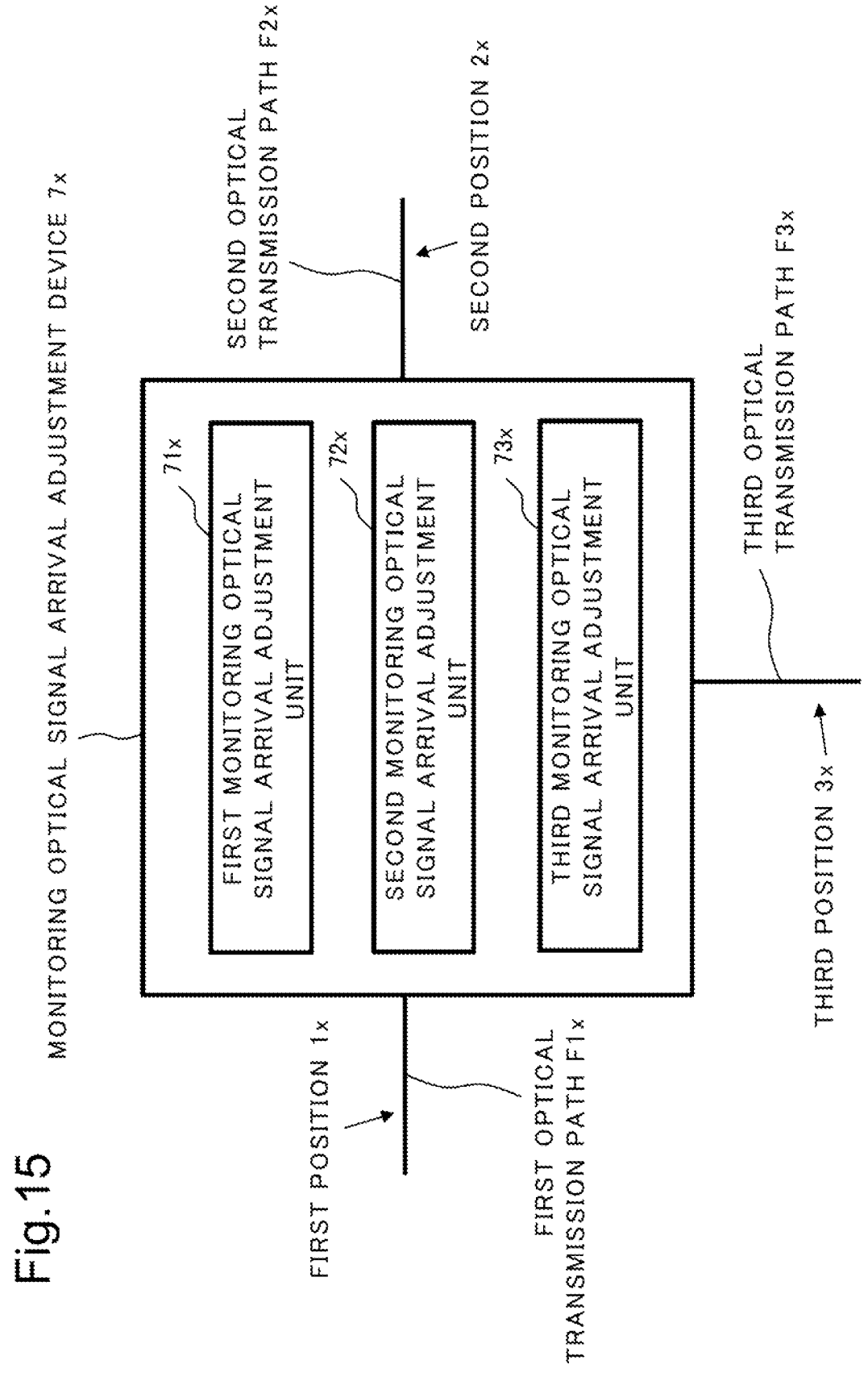
FIG. 15 is a schematic diagram illustrating a minimum configuration of an optical communication transmission path according to the example embodiment.

FIG. 15 is a schematic diagram illustrating a monitoring optical signal arrival adjustment device 7x being a minimum configuration of the monitoring optical signal arrival adjustment device according to the example embodiment. The monitoring optical signal arrival adjustment device 7x includes a first monitoring optical signal arrival adjustment unit 71x, a second monitoring optical signal arrival adjustment unit 72x, and a third monitoring optical signal arrival adjustment unit 73x.

The first monitoring optical signal arrival adjustment unit 71x enables arrival, at a first position 1x being a predetermined position of a first optical transmission path F1x or a second position 2x being a predetermined position of a second optical transmission path F2x, of a first monitoring optical signal being sent to the first position 1x. Herein, the first monitoring optical signal is a monitoring optical signal for monitoring an optical path. The first monitoring optical signal arrival adjustment unit 71x also disables arrival of the first monitoring optical signal at a third position 3x being a predetermined position of a third optical transmission path F3x.

The second monitoring optical signal arrival adjustment unit 72x enables arrival of a second monitoring optical signal being sent to the second position 2x and being the monitoring optical signal at the first position 1x or the second position 2x, and also disables arrival at the third position 3x. The third monitoring optical signal arrival adjustment unit 73x enables arrival of a third monitoring optical signal being sent to the third position 3x and being the monitoring optical signal at the third position 3x, and also disables arrival at both of the first position 1x and the second position 2x.

With the configuration described above, in the monitoring optical signal arrival adjustment device 7x, the first monitoring optical signal and the second monitoring optical signal do not reach the third position 3x, and the third monitoring optical signal does not reach the first position 1x and the second position 2x. Thus, the monitoring optical signal arrival adjustment device 7x can make a wavelength (frequency) of the third monitoring optical signal equal to a wavelength (frequency) of the first monitoring optical signal and the second monitoring optical signal.

Thus, the monitoring optical signal arrival adjustment device 7x enables simultaneous monitoring, and also easily performs commonality of parts constituting the optical communication system including the optical communication transmission path including the monitoring optical signal arrival adjustment device 7x. In other words, the monitoring optical signal arrival adjustment device 7x enables simultaneous monitoring, and also facilitates commonality of parts in the optical communication system. Thus, the monitoring optical signal arrival adjustment device 7x with the above-described configuration achieves the effect described in the section of [Advantageous Effects of Invention].

Each of the example embodiments of the present invention is described above, but the present invention is not limited to the example embodiments described above, and further modification, replacement, and adjustment can be added without departing from a basic technical idea of the present invention. For example, a configuration of an element illustrated in each of the drawings is one example for facilitating understanding of the present invention, and the present invention is not limited to the configuration illustrated in the drawings.

The whole or part of the example embodiments disclosed above can be described as, but not limited to, the following supplementary notes.

(Supplementary Note 1)

A monitoring optical signal arrival adjustment device including:

a first monitoring optical signal arrival adjustment unit that enables arrival, at a first position being a predetermined position of a first optical transmission path or a second position being a predetermined position of a second optical transmission path, of a first monitoring optical signal being sent to the first position and being a monitoring optical signal for monitoring an optical path, and disables arrival at a third position being a predetermined position of a third optical transmission path;

a second monitoring optical signal arrival adjustment unit that enables arrival of a second monitoring optical signal being sent to the second position and being the monitoring optical signal at the first position or the second position, and disables arrival at the third position; and a third monitoring optical signal arrival adjustment unit that enables arrival of a third monitoring optical signal being sent to the third position and being the monitoring optical signal at the third position, and disables arrival at both of the first position and the second position.

(Supplementary Note 2)

The monitoring optical signal arrival adjustment device according to supplementary note 1, wherein each of the first optical transmission path, the second optical transmission path, and the third optical transmission path is a bidirectional optical transmission path including a pair of optical fiber core wires that enable bidirectional traveling of an optical signal.

(Supplementary Note 3)

The monitoring optical signal arrival adjustment device according to supplementary note 2, wherein the monitoring optical signal arrival adjustment device is included in an optical communication transmission path including the first optical transmission path, the second optical transmission path, the third optical transmission path, and a branch device being able to connect the first optical transmission path and the second optical transmission path in such a way that a communication optical signal traveling through the first optical transmission path and the second optical transmission path passes through the third optical transmission path.

(Supplementary Note 4)

The monitoring optical signal arrival adjustment device according to supplementary note 2 or 3, wherein the first monitoring optical signal arrival adjustment unit disables arrival of the first monitoring optical signal at the third optical transmission path, the second monitoring optical signal arrival adjustment unit disables arrival of the second monitoring optical signal at the third optical transmission path, and the third monitoring optical signal arrival adjustment unit disables arrival of the third monitoring optical signal at the first optical transmission path and the second optical transmission path.

(Supplementary Note 5)

The monitoring optical signal arrival adjustment device according to any one of supplementary notes 2 to 4, wherein the first monitoring optical signal arrival adjustment unit enables arrival of the first monitoring optical signal at a second terminal station that sends the second monitoring optical signal, and the second monitoring optical signal arrival adjustment unit enables arrival of the second monitoring optical signal at a first terminal station that sends the first monitoring optical signal.

(Supplementary Note 6)

The monitoring optical signal arrival adjustment device according to any one of supplementary notes 2 to 5, wherein the first monitoring optical signal arrival adjustment unit includes a first wavelength selection reflector that reflects the first monitoring optical signal and passes a first communication optical signal being a communication optical signal as the optical signal for optical communication and being sent to the first position, and a first optical path that causes the first monitoring optical signal reflected by the first wavelength selection reflector to be incident on the second optical transmission path, the second monitoring optical signal arrival adjustment unit includes a second wavelength selection reflector that reflects the second monitoring optical signal and passes a second communication optical signal being the communication optical signal and being sent to the second position, and a second optical path that causes the second monitoring optical signal reflected by the second wavelength selection reflector to be incident on the first optical transmission path, and the third monitoring optical signal arrival adjustment unit includes a third wavelength selection reflector that reflects the third monitoring optical signal and passes a third communication optical signal being the communication optical signal and being sent to the third position, and a third optical path that causes the third monitoring optical signal reflected by the third wavelength selection reflector to be incident on the third optical transmission path.

(Supplementary Note 7)

The monitoring optical signal arrival adjustment device according to supplementary note 6, wherein a frequency of the first monitoring optical signal and a frequency of the first communication optical signal are different, and the first wavelength selection reflector reflects the optical signal having a frequency of the first monitoring optical signal and passes the optical signal having a frequency of the first communication optical signal, a frequency of the second monitoring optical signal and a frequency of the second communication optical signal are different, and the second wavelength selection reflector reflects the optical signal having a frequency of the second monitoring optical signal and passes the optical signal having a frequency of the second communication optical signal, and a frequency of the third monitoring optical signal and a frequency of the third communication optical signal are different, and the third wavelength selection reflector reflects the optical signal having a frequency of the third monitoring optical signal and passes the optical signal having a frequency of the third communication optical signal.

(Supplementary Note 8)

The monitoring optical signal arrival adjustment device according to supplementary note 6 or 7, wherein each of the first optical path, the second optical path, and the third optical path includes an optical circulator, an optical coupler, and a connection optical fiber core wire that connects the optical circulator and the optical coupler.

(Supplementary Note 9)

The monitoring optical signal arrival adjustment device according to any one of supplementary notes 2 to 4, wherein the first monitoring optical signal arrival adjustment unit enables arrival of the first monitoring optical signal at a first terminal station that sends the first monitoring optical signal, and the second monitoring optical signal arrival adjustment unit enables arrival of the second monitoring optical signal at a second terminal station that sends the second monitoring optical signal.

(Supplementary Note 10)

The monitoring optical signal arrival adjustment device according to supplementary note 9, wherein the first monitoring optical signal arrival adjustment unit includes a first wavelength selection reflector that reflects the first monitoring optical signal and passes a first communication optical signal being a communication optical signal as the optical signal for optical communication and being sent to the first position, and a fourth optical path that causes the first monitoring optical signal reflected by the first wavelength selection reflector to be incident on the first optical transmission path, the second monitoring optical signal arrival adjustment unit includes a second wavelength selection reflector that reflects the second monitoring optical signal and passes a second communication optical signal being the communication optical signal and being sent to the second position, and a fifth optical path that causes the second monitoring optical signal reflected by the second wavelength selection reflector to be incident on the second optical transmission path, and the third monitoring optical signal arrival adjustment unit includes a third wavelength selection reflector that reflects the third monitoring optical signal and passes a third communication optical signal being the communication optical signal and being sent to the third position, and a third optical path that causes the third monitoring optical signal reflected by the third wavelength selection reflector to be incident on the third optical transmission path.

(Supplementary Note 11)

The monitoring optical signal arrival adjustment device according to supplementary note 10, wherein a frequency of the first monitoring optical signal and a frequency of the first communication optical signal are different, and the first wavelength selection reflector reflects the optical signal having a frequency of the first monitoring optical signal and passes the optical signal having a frequency of the first communication optical signal, a frequency of the second monitoring optical signal and a frequency of the second communication optical signal are different, and the second wavelength selection reflector reflects the optical signal having a frequency of the second monitoring optical signal and passes the optical signal having a frequency of the second communication optical signal, and a frequency of the third monitoring optical signal and a frequency of the third communication optical signal are different, and the third wavelength selection reflector reflects the optical signal having a frequency of the third monitoring optical signal and passes the optical signal having a frequency of the third communication optical signal.

(Supplementary Note 12)

The monitoring optical signal arrival adjustment device according to supplementary note 10 or 11, wherein each of the third optical path, the fourth optical path, and the fifth optical path includes an optical isolator, a first optical coupler, a second optical coupler, and a connection optical fiber core wire that connects the first optical coupler and the second optical coupler.

(Supplementary Note 13)

The monitoring optical signal arrival adjustment device according to any one of supplementary notes 1 to 12, wherein the first monitoring optical signal arrival adjustment unit and the second monitoring optical signal arrival adjustment unit are installed in a combination of the first optical transmission path, the second optical transmission path, and a branch device being able to connect the first optical transmission path and the second optical transmission path in such a way that a communication optical signal traveling through the first optical transmission path and the second optical transmission path passes through the third optical transmission path, and the third monitoring optical signal arrival adjustment unit is installed in a combination of the third optical transmission path and the branch device.

(Supplementary Note 14)

The monitoring optical signal arrival adjustment device according to supplementary note 13, wherein at least one of the first monitoring optical signal arrival adjustment unit, the second monitoring optical signal arrival adjustment unit, and the third monitoring optical signal arrival adjustment unit is installed in the branch device.

(Supplementary Note 15)

The monitoring optical signal arrival adjustment device according to supplementary note 14, wherein each of the first monitoring optical signal arrival adjustment unit, the second monitoring optical signal arrival adjustment unit, and the third monitoring optical signal arrival adjustment unit is installed in the branch device.

(Supplementary Note 16)

An optical communication transmission path including:

the monitoring optical signal arrival adjustment device according to any one of supplementary notes 1 to 15; and at least one of the first optical transmission path, the second optical transmission path, and the third optical transmission path.

(Supplementary Note 17)

An optical communication system including:

the optical communication transmission path according to supplementary note 16; and at least one of a first terminal station that sends the first monitoring optical signal, a second terminal station that sends the second monitoring optical signal, and a third terminal station that sends the third monitoring optical signal.

(Supplementary Note 18)

An optical communication transmission path monitoring method including monitoring, by the first monitoring optical signal, the second monitoring optical signal, and the third monitoring optical signal, a portion of an optical communication transmission path through which each of the first monitoring optical signal, the second monitoring optical signal, and the third monitoring optical signal passes, the optical communication transmission path including the monitoring optical signal arrival adjustment device according to supplementary note 2, the optical communication transmission path including the first optical transmission path, the second optical transmission path, the third optical transmission path, and a branch device being able to connect the first optical transmission path and the second optical transmission path in such a way that the communication optical signal traveling through the first optical transmission path and the second optical transmission path passes through the third optical transmission path.

Note that, in the supplementary notes described above, the "first optical transmission path" is, for example, a combination of the optical fiber core wire F1U and the optical fiber core wire F1D in FIG. 2, 6, 8, 9, or 10, a combination of the optical fiber core wires F1aU, F1bU, F1aD, and F1bD in FIG. 7, or the first optical transmission path F1x in FIG. 15. Further, the "first position" is, for example, a position in which the combination of the optical fiber core wire F1U and the optical fiber core wire F1D in FIG. 2, 6, 8, 9, or 10 enters the branch device BK1. Alternatively, the "first position" is, for example, a position in which the combination of the optical fiber core wires F1aU, F1bU, F1aD, and F1bD in FIG. 7 enters the branch device BK1. Alternatively, the "first position" is, for example, the first position 1x in FIG. 15.

Further, the "second optical transmission path" is, for example, a combination of the optical fiber core wires F2U and F2D in FIG. 2, 6, 8, 9, or 10, a combination of the optical fiber core wires F2aU, F2bU, F2aD, and F2bD in FIG. 7, or the second optical transmission path F2x in FIG. 15. Further, the "second position" is, for example, a position in which the combination of the optical fiber core wires F2U and F2D in FIG. 2, 6, 8, 9, or 10 enters the branch device BK1. Alternatively, the "second position" is, for example, a position in which the combination of the optical fiber core wires F2aU, F2bU, F2aD, and F2bD in FIG. 7 enters the branch device BK1. Alternatively, the "second position" is, for example, the second position 2x in FIG. 15.

Further, the "third optical transmission path" is, for example, a combination of the optical fiber core wires F3U, F3D, F4U, and F4D in FIG. 2, 6, 7, 8, 9, or 10 or the third optical transmission path F3x in FIG. 15. Further, the "third position" is, for example, a position in which the combination of the optical fiber core wires F3U, F3D, F4U, and F4D in FIG. 2, 6, 9, or 10 enters the branch device BK1. Alternatively, the "second position" is, for example, a position in which the combination of the optical fiber core wires F2aU, F2bU, F2aD, and F2bD in FIG. 8 exits from the relay CK3 toward the terminal station T3. Alternatively, the "third position" is, for example, the third position 3x in FIG. 15.

Further, the "third monitoring optical signal" is one or both of the third monitoring optical signal and the fourth monitoring optical signal in the description of the example embodiment. Further, the "branch device" is, for example, the branch device BK1 in FIG. 2, 6, 7, 8, 9, or 10 or the branch device BK1x in FIG. 15.

Further, the "first monitoring optical signal arrival adjustment unit" is, for example, a combination of the wavelength selection reflector B1, the optical circulator C1, the optical fiber core wire BP1, and the optical coupler P4 in FIG. 2, 6, 7, or 8. Alternatively, the "first monitoring optical signal arrival adjustment unit" is, for example, a combination of the wavelength selection reflector B1, the optical isolator I1, the optical couplers P5 and P6, and an optical fiber core wire that connects the optical couplers P5 and P6 in FIG. 9 or 10. Alternatively, the "first monitoring optical signal arrival adjustment unit" is, for example, the first monitoring optical signal arrival adjustment unit 71x in FIG. 15.

Further, the "second monitoring optical signal arrival adjustment unit" is, for example, a combination of the wavelength selection reflector B3, the optical circulator C3, the optical fiber core wire BP2, and the optical coupler P1 in FIG. 2, 6, 7, or 8. Alternatively, the "second monitoring optical signal arrival adjustment unit" is, for example, a combination of the wavelength selection reflector B3, the optical isolator I4, the optical couplers P7 and P8, and an optical fiber core wire that connects the optical couplers P7 and P8 in FIG. 9 or 10. Alternatively, the "second monitoring optical signal arrival adjustment unit" is, for example, the second monitoring optical signal arrival adjustment unit 72x in FIG. 15.

Further, the "third monitoring optical signal arrival adjustment unit" is, for example, a combination of the wavelength selection reflector B4, the optical circulator C4, the optical fiber core wire BP4, and the optical coupler P3 in FIG. 2, 6, 7, or 8. Alternatively, the "third monitoring optical signal arrival adjustment unit" is, for example, a combination of the wavelength selection reflector B2, the optical circulator C2, the optical fiber core wire BP3, and the optical coupler P2 in FIG. 2, 6, 7, or 8. Alternatively, the "third monitoring optical signal arrival adjustment unit" is, for example, a combination of the wavelength selection reflector B4, the optical isolator i3, the optical fiber core wire BP4, and the optical couplers P3 and P6 in FIG. 9 or 10. Alternatively, the "third monitoring optical signal arrival adjustment unit" is, for example, a combination of the wavelength selection reflector B2, the optical isolator i2, the optical fiber core wire BP3, and the optical couplers P2 and P5 in FIG. 9 or 10. Alternatively, the "third monitoring optical signal arrival adjustment unit" is, for example, the third monitoring optical signal arrival adjustment unit 73x in FIG. 15.

Further, the "monitoring optical signal arrival adjustment device" is, for example, a combination of the "first monitoring optical signal arrival adjustment unit", the "second monitoring optical signal arrival adjustment unit", and the "third monitoring optical signal arrival adjustment unit" in each diagram. Alternatively, the "monitoring optical signal arrival adjustment device" is, for example, the monitoring optical signal arrival adjustment devices 7a1 to 7a3 in FIGS. 13 and 14.

Further, the "optical communication transmission path" is, for example, a portion other than the terminal stations T1, T2, and T3 in FIGS. 2, 6, 7, 8, 9, and 10. Further, the "first wavelength selection reflector" is, for example, the wavelength selection reflector B1 in FIGS. 2, 6, 7, 8, 9, and 10.

Further, the "first terminal station" is, for example, the terminal station T1 in FIG. 2, 6, 7, 8, 9, or 10. Further, the "second terminal station" is, for example, the terminal station T2 in FIG. 2, 6, 7, 8, 9, or 10. The "third terminal station" is, for example, the terminal station T3 in FIG. 2, 6, 7, 8, 9, or 10.

Further, the "first optical path" is, for example, a combination of the optical circulator C1, the optical fiber core wire BP1, and the optical coupler P4 in FIG. 2, 6, 7, or 8. Alternatively, the "first optical path" is, for example, a combination of the optical isolator I1, the optical couplers P5 and P6, and an optical fiber core wire that connects the optical couplers P5 and P6 in FIG. 9 or 10.

Further, the "second wavelength selection reflector" is, for example, the wavelength selection reflector B3 in FIGS. 2, 6, 7, 8, 9, and 10. Further, the "second optical path" is, for example, a combination of the optical circulator C3, the optical fiber core wire BP2, and the optical coupler P1 in FIG. 2, 6, 7, or 8. Alternatively, the "second optical path" is, for example, a combination of the optical isolator I4, the optical couplers P7 and P8, and an optical fiber core wire that connects the optical couplers P7 and P8 in FIG. 9 or 10.

Further, the "third wavelength selection reflector" is, for example, the wavelength selection reflector B2 or B4 in FIG. 2, 6, 7, 8, 9, or 10. Further, the "third optical path" is, for example, a combination of the optical circulator C4, the optical fiber core wire BP4, and the optical coupler P3 in FIG. 2, 6, 7, or 8. Alternatively, the "third optical path" is, for example, a combination of the optical circulator C2, the optical fiber core wire BP3, and the optical coupler P2 in FIG. 2, 6, 7, or 8.

Alternatively, the "third optical path" is, for example, a combination of the optical isolator i3, the optical fiber core wire BP4, and the optical couplers P3 and P6 in FIG. 9 or 10. Alternatively, the "third optical path" is, for example, a combination of the optical isolator i2, the optical fiber core wire BP3, and the optical couplers P2 and P5 in FIG. 9 or 10.

Further, the "optical circulator" is, for example, the optical circulators C1 to C4 in FIG. 2, 6, 7, or 8. Further, the "optical coupler" is, for example, the optical couplers P1 to P4 in FIG. 2, 6, 7, or 8. Further, the "connection optical fiber core wire that connects the optical circulator and the optical coupler" is, for example, the optical fiber core wires BP1 to BP4 in FIG. 2, 6, 7, or 8. Further, the "optical isolator" is, for example, the optical isolators i1 to i4 in FIG. 9 or 10.

Further, the "first optical coupler" is, for example, the optical coupler P5, P6, P15, or P18 in FIG. 9 or 10. Further, the "second optical coupler" is, for example, the optical coupler P2, P3, P16, or P17 in FIG. 9 or 10.

Further, the "optical communication system" is, for example, the optical communication system 101 in FIG. 2, 6, 7, 8, 9, or 10. Further, the "optical communication transmission path monitoring method" is, for example, a monitoring method illustrated in FIG. 7 or 10.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-156151, filed on Sep. 17, 2020, the disclosure of which is incorporated herein in its entirety by reference.

REFERENCE SIGNS LIST

101 Optical communication system
111 Trunk
121 Branch
1x First position
2x Second position
3x Third position
7a1, 7a2, 7a3, 7x Monitoring optical signal arrival adjustment device
81, 82, 83, 84, 85, 86, 87, 88 Arrow
71x First monitoring optical signal arrival adjustment unit
72x Second monitoring optical signal arrival adjustment unit
73x Third monitoring optical signal arrival adjustment unit
91, 92 Communication optical signal
1-1, 1-2, 1-3, 1-4, 1-5, 1-6, 2-1, 2-2, 2-3, 2-4, 2-5, 2-6, 2-7, 2-8, 3-1, 3-2,
3-3, 3-4 Optical signal
A1, A2, A3, A4, A5, A6, A7, A8 Optical amplifier
B1, B2, B3, B4, B11, B12, B13, B14 Wavelength selection reflector
BP1, BP2, BP3, BP4, BP11, BP12, BP13, BP14, F1U, FID, F1aU, F1bU, F2aU, F2bU, F2U, F2D, F3U, F3D, F4U, F4D Optical fiber core wire
BK1, BK1x Branch device
C1, C2, C3, C4 Optical circulator
CK1, CK2, CK3 Relay
F1x First optical transmission path
F2x Second optical transmission path
F3x Third optical transmission path
I1, I2, I3, I4 Optical isolator
T1, T2, T3 Terminal station
P1, P2, P3, P4, P5, P6, P7, P8, P15, P16, P17, P18 Optical coupler
S1, S2, S3, S4 Optical switch

What is claimed is:

1. A monitoring optical signal arrival adjustment device comprising:

a first monitoring optical signal arrival adjuster configured to enable arrival, at a first position, which is a predetermined position of a first optical transmission path, or a second position, which is a predetermined position of a second optical transmission path, of a first monitoring optical signal sent to the first position and being a monitoring optical signal for monitoring an optical path, and disable arrival at a third position, which is a predetermined position of a third optical transmission path;

a second monitoring optical signal arrival adjuster configured to enable arrival of a second monitoring optical signal sent to the second position and being the monitoring optical signal at the first position or the second position, and disable arrival at the third position; and a third monitoring optical signal arrival adjuster configured to enable arrival of a third monitoring optical signal sent to the third position and being the monitoring optical signal at the third position, and disable arrival at both of the first position and the second position, wherein:

each of the first optical transmission path, the second optical transmission path, and the third optical transmission path is a bidirectional optical transmission path comprising a pair of optical fiber core wires that enable bidirectional traveling of an optical signal, the first monitoring optical signal arrival adjuster comprises a first wavelength selection reflector configured to reflect the first monitoring optical signal and pass a first communication optical signal, which is a communication optical signal, as an optical signal for optical communication, and which is sent to the first position, and a first optical path that causes the first monitoring optical signal reflected by the first wavelength selection reflector to be incident on the second optical transmission path, the second monitoring optical signal arrival adjuster comprises a second wavelength selection reflector configured to reflect the second monitoring optical signal and pass a second communication optical signal, which is the communication optical signal, and being sent to the second position, and a second optical path that causes the second monitoring optical signal reflected by the second wavelength selection reflector to be incident on the first optical transmission path, the third monitoring optical signal arrival adjuster comprises a third wavelength selection reflector configured to reflect the third monitoring optical signal and pass a third communication optical signal, which is the communication optical signal, and being sent to the third position, and a third optical path that causes the third monitoring optical signal reflected by the third wavelength selection reflector to be incident on the third optical transmission path, and each of the first optical path, the second optical path, and the third optical path comprises an optical circulator, an optical coupler, and a connection optical fiber core wire that connects the optical circulator and the optical coupler.

2. The monitoring optical signal arrival adjustment device according to claim 1, wherein the monitoring optical signal arrival adjustment device is included in an optical communication transmission path comprising the first optical transmission path, the second optical transmission path, the third optical transmission path, and a branch device configured to connect the first optical transmission path and the second optical transmission path in such a way that a communication optical signal traveling through the first optical transmission path and the second optical transmission path passes through the third optical transmission path.

3. The monitoring optical signal arrival adjustment device according to claim 1, wherein:

the first monitoring optical signal arrival adjuster is configured to disable arrival of the first monitoring optical signal at the third optical transmission path, the second monitoring optical signal arrival adjuster is configured to disable arrival of the second monitoring optical signal at the third optical transmission path, and the third monitoring optical signal arrival adjuster is configured to disable arrival of the third monitoring optical signal at the first optical transmission path and the second optical transmission path.

4. The monitoring optical signal arrival adjustment device according to claim 1, wherein:

the first monitoring optical signal arrival adjuster is configured to enable arrival of the first monitoring optical signal at a second terminal station configured to send the second monitoring optical signal, and the second monitoring optical signal arrival adjuster is configured to enable arrival of the second monitoring optical signal at a first terminal station configured to send the first monitoring optical signal.

5. The monitoring optical signal arrival adjustment device according to claim 1, wherein:

a frequency of the first monitoring optical signal and a frequency of the first communication optical signal are different, and the first wavelength selection reflector is configured to reflect the optical signal having a frequency of the first monitoring optical signal and passes the optical signal having a frequency of the first communication optical signal, a frequency of the second monitoring optical signal and a frequency of the second communication optical signal are different, and the second wavelength selection reflector is configured to reflect the optical signal having a frequency of the second monitoring optical signal and passes the optical signal having a frequency of the second communication optical signal, and a frequency of the third monitoring optical signal and a frequency of the third communication optical signal are different, and the third wavelength selection reflector is configured to reflect the optical signal having a frequency of the third monitoring optical signal and passes the optical signal having a frequency of the third communication optical signal.

6. An optical communication transmission path comprising:

the monitoring optical signal arrival adjustment device according to claim 1; and at least one of the first optical transmission path, the second optical transmission path, and the third optical transmission path.

7. An optical communication system comprising:

the optical communication transmission path according to claim 6; and at least one of a first terminal station configured to send the first monitoring optical signal, a second terminal station configured to send the second monitoring optical signal, and a third terminal station configured to send the third monitoring optical signal.

8. A monitoring optical signal arrival adjustment device comprising:

a first monitoring optical signal arrival adjuster configured to enable arrival, at a first position, which is a predetermined position of a first optical transmission path, or a second position, which is, a predetermined position of a second optical transmission path, of a first monitoring optical signal sent to the first position and being a monitoring optical signal for monitoring an optical path, and disable arrival at a third position, which is, a predetermined position of a third optical transmission path;

a second monitoring optical signal arrival adjuster configured to enable arrival of a second monitoring optical signal sent to the second position and being the monitoring optical signal at the first position or the second position, and disable arrival at the third position; and a third monitoring optical signal arrival adjuster configured to enable arrival of a third monitoring optical signal sent to the third position and being the monitoring optical signal at the third position, and disable arrival at both of the first position and the second position, wherein:

each of the first optical transmission path, the second optical transmission path, and the third optical transmission path is a bidirectional optical transmission path comprising a pair of optical fiber core wires that enable bidirectional traveling of an optical signal, wherein:

the first monitoring optical signal arrival adjuster is configured to enable arrival of the first monitoring optical signal at a first terminal station configured to send the first monitoring optical signal, the second monitoring optical signal arrival adjuster is configured to enable arrival of the second monitoring optical signal at a second terminal station configured to send the second monitoring optical signal, the first monitoring optical signal arrival adjuster comprises a first wavelength selection reflector configured to reflect the first monitoring optical signal and pass a first communication optical signal, which is the optical signal for optical communication, and which is sent to the first position, and a fourth optical path that causes the first monitoring optical signal reflected by the first wavelength selection reflector to be incident on the first optical transmission path, the second monitoring optical signal arrival adjuster comprises a second wavelength selection reflector configured to reflect the second monitoring optical signal and pass a second communication optical signal, which is the optical signal for the optical communication and, which is sent to the second position, and a fifth optical path that causes the second monitoring optical signal reflected by the second wavelength selection reflector to be incident on the second optical transmission path, and the third monitoring optical signal arrival adjuster comprises a third wavelength selection reflector configured to reflect the third monitoring optical signal and pass a third communication optical signal, which is the optical signal for the optical communication, which is sent to the third position, and a third optical path that causes the third monitoring optical signal reflected by the third wavelength selection reflector to be incident on the third optical transmission path.

9. The monitoring optical signal arrival adjustment device according to claim 8, wherein:

a frequency of the first monitoring optical signal and a frequency of the first communication optical signal are different, and the first wavelength selection reflector is configured to reflect the optical signal having a frequency of the first monitoring optical signal and passes the optical signal having a frequency of the first communication optical signal, a frequency of the second monitoring optical signal and a frequency of the second communication optical signal are different, and the second wavelength selection reflector is configured to reflect the optical signal having a frequency of the second monitoring optical signal and passes the optical signal having a frequency of the second communication optical signal, and a frequency of the third monitoring optical signal and a frequency of the third communication optical signal are different, and the third wavelength selection reflector is configured to reflect the optical signal having a frequency of the third monitoring optical signal and passes the optical signal having a frequency of the third communication optical signal.

10. The monitoring optical signal arrival adjustment device according to claim 8, wherein each of the third optical path, the fourth optical path, and the fifth optical path comprises an optical isolator, a first optical coupler, a second optical coupler, and a connection optical fiber core wire that connects the first optical coupler and the second optical coupler.

11. The monitoring optical signal arrival adjustment device according to claim 8, wherein:

the first monitoring optical signal arrival adjuster and the second monitoring optical signal arrival adjuster are installed in a combination of the first optical transmission path, the second optical transmission path, and a branch device configured to connect the first optical transmission path and the second optical transmission path in such a way that a communication optical signal traveling through the first optical transmission path and the second optical transmission path passes through the third optical transmission path, and the third monitoring optical signal arrival adjuster is installed in a combination of the third optical transmission path and the branch device.

12. The monitoring optical signal arrival adjustment device according to claim 11, wherein at least one of the first monitoring optical signal arrival adjuster, the second monitoring optical signal arrival adjuster, and the third monitoring optical signal arrival adjuster is installed in the branch device.

13. The monitoring optical signal arrival adjustment device according to claim 12, wherein each of the first monitoring optical signal arrival adjuster, the second monitoring optical signal arrival adjuster, and the third monitoring optical signal arrival adjuster is installed in the branch device.

14. A monitoring method for an optical communication transmission path, the optical communication transmission path comprising a monitoring optical signal arrival adjustment device, the monitoring optical signal arrival adjustment device comprising:

a first monitoring optical signal arrival adjuster configured to enable arrival, at a first position, which is a predetermined position of a first optical transmission path, or a second position, which is a predetermined position of a second optical transmission path, of a first monitoring optical signal sent to the first position and being a monitoring optical signal for monitoring an optical path, and disable arrival at a third position, which is a predetermined position of a third optical transmission path;

a second monitoring optical signal arrival adjuster configured to enable arrival of a second monitoring optical signal sent to the second position and being the monitoring optical signal at the first position or the second position, and disable arrival at the third position; and a third monitoring optical signal arrival adjuster configured to enable arrival of a third monitoring optical signal sent to the third position and being the monitoring optical signal at the third position, and disable arrival at both of the first position and the second position, wherein:

the monitoring method comprises monitoring, by the first monitoring optical signal, the second monitoring optical signal, and the third monitoring optical signal, a portion of the optical communication transmission path through which each of the first monitoring optical signal, the second monitoring optical signal, and the third monitoring optical signal passes, the optical communication transmission path comprises the first optical transmission path, the second optical transmission path, the third optical transmission path, and a branch device configured to connect the first optical transmission path and the second optical transmission path in such a way that the optical signal for optical communication traveling through the first optical transmission path and the second optical transmission path passes through the third optical transmission path, each of the first optical transmission path, the second optical transmission path, and the third optical transmission path is a bidirectional optical transmission path comprising a pair of optical fiber core wires that enable bidirectional traveling of an optical signal, the first monitoring optical signal arrival adjuster comprises a first wavelength selection reflector configured to reflect the first monitoring optical signal and pass a first communication optical signal, which is a communication optical signal, as the optical signal for optical communication, and which is sent to the first position, and a first optical path that causes the first monitoring optical signal reflected by the first wavelength selection reflector to be incident on the second optical transmission path, the second monitoring optical signal arrival adjuster comprises a second wavelength selection reflector configured to reflect the second monitoring optical signal and pass a second communication optical signal, which is the communication optical signal, and which is sent to the second position, and a second optical path that causes the second monitoring optical signal reflected by the second wavelength selection reflector to be incident on the first optical transmission path, the third monitoring optical signal arrival adjuster comprises a third wavelength selection reflector configured to reflect the third monitoring optical signal and pass a third communication optical signal, which is the communication optical signal, and which is sent to the third position, and a third optical path that causes the third monitoring optical signal reflected by the third wavelength selection reflector to be incident on the third optical transmission path, and each of the first optical path, the second optical path, and the third optical path comprises an optical circulator, an optical coupler, and a connection optical fiber core wire that connects the optical circulator and the optical coupler.

* * * * *